(12) United States Patent
Geurts et al.

(10) Patent No.: US 6,992,798 B2
(45) Date of Patent: Jan. 31, 2006

(54) APPARATUS, PRODUCT, AND METHOD OF TRAPPING USING A DISTANCE BUFFER

(75) Inventors: Wim Geurts, Ghent (BE); Kristiaan K. A. Van Bael, Hasselt (BE); Wim J. C. Fransen, Bomem (BE)

(73) Assignee: Agfa-Bevaert N.V., Mortsel (BE)

(*) Notice: Subject to any disclaimer, the term of this patent is extended or adjusted under 35 U.S.C. 154(b) by 1003 days.

(21) Appl. No.: 09/800,428

(22) Filed: Mar. 5, 2001

(65) Prior Publication Data

US 2001/0055130 A1 Dec. 27, 2001

Related U.S. Application Data

(60) Provisional application No. 60/188,030, filed on Mar. 9, 2000.

(51) Int. Cl.
  *H04N 1/40* (2006.01)
(52) U.S. Cl. .................... 358/3.15; 358/3.27
(58) Field of Classification Search ............. 358/1.9, 358/2.1, 3.14–3.15, 3.24–3.27, 530
  See application file for complete search history.

(56) References Cited

U.S. PATENT DOCUMENTS

| | | | |
|---|---|---|---|
| 4,583,116 A | 4/1986 | Hennig et al. | 358/75 |
| 4,931,861 A | 6/1990 | Taniguchi | 358/75 |
| 5,113,249 A | 5/1992 | Yosefi | 358/75 |
| 5,131,058 A | 7/1992 | Ting et al. | 382/47 |
| 5,295,236 A | 3/1994 | Bjorge et al. | 395/134 |
| 5,313,570 A | 5/1994 | Dermer et al. | 395/131 |
| 5,440,652 A | 8/1995 | Ting | 382/165 |
| 5,542,052 A * | 7/1996 | Deutsch et al. | 345/589 |
| 5,581,667 A | 12/1996 | Bloomberg | 395/109 |
| 5,613,046 A | 3/1997 | Dermer | 395/109 |
| 5,666,543 A | 9/1997 | Gartland | 395/788 |
| 5,668,931 A | 9/1997 | Dermer | 395/104 |
| 5,761,392 A | 6/1998 | Yacoub et al. | 395/109 |
| 6,697,078 B2 * | 2/2004 | Becker et al. | 345/589 |
| 6,781,720 B1 * | 8/2004 | Klassen | 358/3.27 |

\* cited by examiner

*Primary Examiner*—Thomas D. Lee
*Assistant Examiner*—Stephen Brinich
(74) *Attorney, Agent, or Firm*—Robert A. Sabourin

(57) ABSTRACT

A method, apparatus, and product to generate trap areas. One embodiment is a method for generating a trap pixel of a trap area surrounding one or more trapping edges of an image that includes, for each trapping edge in the image, and for each pixel within a predefined area around the trapping edge, comparing the distance of the pixel from the trapping edge according to a distance measure with a provided measure indicative of the distance of the pixel from any edge of the image to determine if said each pixel is closer to the trapping edge than to another edge. The method further includes, if said pixel is closer to said edge than to any edge, setting the pixel as a trap pixel of the trap area, including setting a trap color for the trap pixel.

79 Claims, 10 Drawing Sheets

- ENHANCE EDGES OF AN ORIGINAL IMAGE TO FORM AN EDGE IMAGE COMPRISING A SET OF ENHANCED PIXELS;
- INITIALIZE STORED DISTANCE MEASURE MEMORY (D-BUFFFER) FOR ALL PIXELS;
- FOR EACH ENHANCED PIXEL IN EDGE IMAGE,
- BEGINFOR
    - IF PIXEL IS AN EDGE PIXEL AS DETERMINED BY COMPARING THE PIXEL OF EACH SEPARATION TO A THRESHOLD
    - BEGINIF
        - APPLY TRAPPING CRITERION TO DETERMINE IF EDGE PIXEL IT TO BE TRAPPED;
        - IF EDGE PIXEL IS A TRAPPED EDGE PIXEL
        - BEGINIF
            - DETERMINE COLOR OF TRAP;
            - FOR EACH SEPARATION FOR EACH PIXEL IN SEPARATION WITHIN THE TRAPPING DISTANCE OF THE TRAPPED EDGE PIXEL
            - BEGINFOR
                - DETERMINE DISTANCE MEASURE OF THE PIXEL TO THE TRAPPED EDGE PIXEL;
                - COMPARE DETERMINED DISTANCE TO THE D-BUFFER STORED DISTANCE MEASURE FOR THE PIXEL;
                - IF DISTANCE MEASURE COMPARISON INDICATES PIXEL IS CLOSER THAN OTHER EDGES (STORED D-BUFFER VALUE)
                - BEGINIF
                    - MAKE PIXEL A TRAP PIXEL/IMPOSE TRAP COLOR;
                    - STORE DETERMINED DISTANCE MEASURE IN THE STORED DISTANCE MEASURE MEMORY FOR THE PIXEL;
                - ENDIF;
            - ENDFOR
        - ENDIF
    - ENDIF
- ENDFOR
- COMBINE TRAPS WITH ORIGINAL IMAGE;

FIG. 11

APPARATUS, PRODUCT, AND METHOD OF TRAPPING USING A DISTANCE BUFFER

RELATED U.S. APPLICATION

This application claims the benefit of U.S. Provisional patent application Ser. No. 60/188,030, filed Mar. 9, 2000, entitled "TRAPPING METHOD USING A DISTANCE BUFFER". Provisional patent Application Ser. No. 60/188,030 is incorporated herein by reference.

BACKGROUND

This invention relates to printing multi-color graphic designs, and more particularly, to a method, apparatus, and computer software product of trapping a graphic design prior to printing.

BACKGROUND

Multi-color graphic designs are typically provided in electronic form and are called digital images herein. Such images may include text, line art, and continuous-tone regions. Printing such a digital image with a set of inks involves separating the image into a set of color separations, one separation for each printing ink. Each color separation is a monochrome image that is sequentially printed with its ink on paper or another substrate to form a print of the design. Several printing processes are known. The separations may be exposed directly onto paper or other substrate, using electro-photography or other direct processes. The separations may also be printed using offset and other plate-based printing processes, in which case, a set of printing plates are first made from the separations, and the prints made by sequentially applying each ink using the corresponding plate. The plates may be directly made using a direct imaging imagesetter, or made from film exposed in an imagesetter.

Misregistration and shifts between the separations may cause several artifacts to appear in printed images. Such artifacts include white bands appearing in the edge between areas of constant color. Spreading or choking areas of constant color to cause overlap is a known method for avoiding such artifacts. The spread itself is called a trap, and the general process for correcting for such misregistration-based artifacts is called trapping.

Methods for automatically trapping digital images are known, and these automatically determine and apply traps. Automatic trapping methods generally include the steps of 1) determining the edges between regions, 2) determining whether or not to apply traps in each such edge, and what the color and location of each trap should be, and 3) applying the traps. Automatic trapping methods fall into two general categories, pixel trapping, and object trapping, and this invention is applicable to both methods. Pixel trapping is most applicable when the images are available in the form of pixel files, while object based trapping is usually applicable to when the images are described in some object form, including in a page description language (PDL) such as a PostScript (Adobe Systems Inc., San Jose, Calif.).

Prior art automatic trapping techniques include those described in U.S. Pat. No. 4,931,861 to Tagunuchi, U.S. Pat. No. 4,583,116 to Hennig et al., U.S. Pat. Nos. 5,113,249, 5,323,248, 5,420,702, and 5,481,379 to Yosefi, U.S. Pat. No. 5,295,236 to Bjorge et al., U.S. Pat. No. 5,542,052 to Deutch et al., U.S. Pat. No. 5,313,570 to Dermer et al., U.S. Pat. Nos. 5,613,046 and 5,668,931 to Derner, U.S. Pat. No. 5,440,652 to Ting, U.S. Pat. No. 5,581,667 to Bloomberg, U.S. Pat. No. 5,666,543 to Garland, and U.S. Pat. No. 5,761,392 to Yacoub et al.

While there is much prior art in automatically determining when traps should be applied, little is known about how to automatically determine trap shapes that are desirable. A trap on an edge between two objects generally extends a distance called the "trapping distance" herein into one of the objects, depending on such criteria as the relative brightness of the objects. Thus, each point on an edge potentially generates a trap area that is at most the trapping distance away from the point. "On edge" trapping generated a trap area that truncates on the object edge, even if otherwise the trap area would extend beyond such an edge. Such "on edge" trapping avoids the trap area of an object exceeding the edge of an adjacent object.

So-called beveled trapping—also called bisector trapping—has the desirable property that trap areas are beveled between edges of objects, so that rather than a trap area truncating on an object edge, the trap area terminates on the bisector of the angle between an object edge and the trap edge (assuming equal trapping distance in all directions). That is, at begin and end areas of traps, the trap area truncates on the centerline between the edge and the trap edge.

So-called centerline trapping has the desirable property that any trap area becomes smaller as the trap area approaches other edges. A centerline trap area extends only to the lesser of the maximum distance from the edge of the trap (i.e., the trapping distance) and the centerline between the trap edge and any other edges. Beveled trapping is centerline trapping restricted to the start and end of trap areas. Beveled trapping thus generates a trap area that follows the bisector of an angle between two edges when the trap area approaches the two edges.

These concepts are now illustrated with the aid of a simple example shown in FIGS. 1A to 1D, in which any trap distances are shown exaggerated in order to illustrate features of the trap shapes. FIG. 1A shows an original image prior to trapping. In FIG. 1A, region 101 is a white background, object 103 is a yellow object, object 105 is a blue object, including a hole 107, which is a white background region. The trap area normally would be yellow and would extend a certain "trapping distance" into the blue region, resulting in a green area between objects 105 and 103. FIG. 1B shows "on-edge" trapping. The trap region 109 truncates on the edge of blue object 105. FIG. 1C shows beveled trapping. The trap region 111 follows the bisector of the angle between the trap edge and the bottom edge of object 105 to form a first bevel, and also follows the bisector of the angle between the trap edge and the left vertical edge of object 105 to form a second bevel. The border of the trap area follows the centerline in these two endpoints. FIG. 1D shows true centerline trapping. Notice that in addition to the bevels of FIG. 1C, the trap region also follows the centerline between the common edge of objects 103 and 105, and the edge of objects 105 near white background 107.

With prior art methods, to achieve any of these often desired shapes, one would need to determine the trap boundaries as some function of the distance from the edges. While on-edge-trap shapes are relatively simple to calculate, determining the centerline between edges may be computationally intense, and is needed in order to determine the trap shape to implement centerline trapping.

To further illustrate these points, FIG. 2A shows an image after beveled trapping. Yellow area 203 has an edge 204 to a darker magenta area 205, and both areas are on a white background 209. Beveled trapping generates a yellow trap area 207. Note that trap area 207 follows the bisector 211 between edge 204 and edge 208. Similarly, FIG. 2B shows the image after trapping of a light gray area 215 next to a dark green area 213 and a dark magenta area 211. Beveled trapping generates the trap areas 217 and 219, normally in light gray. Note that the bisector is followed by the trap areas close to two edges. Finally, FIG. 2C shows centerline trapping.

Presently, with prior art methods, the trap shape would need to be modified to include the bisector for beveled trapping or to follow the centerline for centerline trapping. There is a need in the art for rapidly and automatically determining trap shapes that follow the bisector.

In some applications, for example, in textile and decorative printing, different color combinations of the same design are obtained using the same separations of the design, but with different inks assigned to each separation. Such different color combinations of the same design are called colorways of the design. When trapping such a design, it is important to be able to generate trap areas that extend in both directions of an edge between areas. This enables the same trap areas to be used for different colorways. Of course this assumes the design program enables switching the color of the trap areas when the inks (or colors) assigned to the channels are changed.

It is sometimes desirable to have traps that are dependent on direction. For example, with some printing presses, misregistrations are likely to be larger in one direction than in another. It is desirable to have a trapping method that automatically generates traps that are direction dependent, that is, that extend by a different amount in each direction. Furthermore, a user should easily be able to vary the direction-dependent trapping distances.

It is also sometimes desired to be able to implement traps that gradually fade into another area rather than trap areas that have sudden edges. It is also desirable to be able to implement such "fade" trapping with a user-defined fading profile that can be easily modified, and that can be different in each direction.

While some of these features are possible using prior art trapping techniques, there is still a need for a trapping method that has one or more of the above properties, and that can be implemented on pixel files.

SUMMARY

Described herein are a method, apparatus, and product to generate trap areas. One embodiment is a method for generating a trap pixel of a trap area surrounding one or more trapping edges of an image. One embodiment includes, for each trapping edge in the image, and for each pixel within a predefined area around the trapping edge, comparing the distance of the pixel from the trapping edge according to a distance measure with a provided measure indicative of the distance of the pixel from any edge of the image to determine if said each pixel is closer to the trapping edge than to another edge. The method further includes, if said pixel is closer to said edge than to any edge, setting the pixel as a trap pixel of the trap area, including setting a trap color for the trap pixel.

One embodiment includes determining the trapping edges of the image by applying a trapping criterion to a neighborhood of each edge of the image. In one version, the edges are provides, and in another, the edges are determined by edge detection.

In one embodiment, the trap color is user-provided. The trap color also may be determined according to a trapping criterion applied to the neigborhood of the edge. In one embodiment, the trapping crierion is a lightness criterion.

In one embodiment, the distance of a pixel from an edge point according to the distance measure defines a point distance function centered on the edge point, with the maximum extent of the point distance function from the center being the trapping distance. The distance-determining step uses the point distance function. In one embodiment, the point distance function is pre-calculated. In another, the distance-determining step determines the distance by on-the-fly calculation.

In general, the trapping distance from any point on an edge may vary as a function of direction from the point on the edge. In one case, it is the same in all directions. Furthermore, the trap color in a trap area may be constant, or may be modulated by a modulation factor, the modulation factor being a function of the distance from the edge.

In one embodiment, applicable when at least some of the edges are defined by an edge line object having a geometric description, the step of comparing the distance includes determining the distances from the geometric description of the edge line object for any edge defined by an edge line object.

In one embodiment when at least some of the edges are defined by a set of edge pixels, the method includes carrying out the steps described above for each edge in the image for each edge pixel of any edge that is defined by a set of edge pixels.

In a particular version, for the case of an edge defined by edge pixels, the comparing step compares the determined distance measure to the value stored in a pixel buffer containing at each pixel location the distance measure of that pixel location to the nearest so-far encountered edge pixel of the image. Setting the trap pixel then further includes replaces the value stored in the pixel buffer with the determined distance measure for the pixel. The method thereby generates a centerline trap area around the edge pixel.

Other aspects of the invention will be clear from the detailed description below.

BRIEF DESCRIPTION OF THE FIGURES

In order to show the features of the invention, without any limitation implied therein, several embodiments of the invention are described in greater detail, with reference to the enclosed drawings in which:

FIG. 11 shows pseudocode for an embodiment of the method of the invention.

DETAILED DESCRIPTION

Figure 3A:
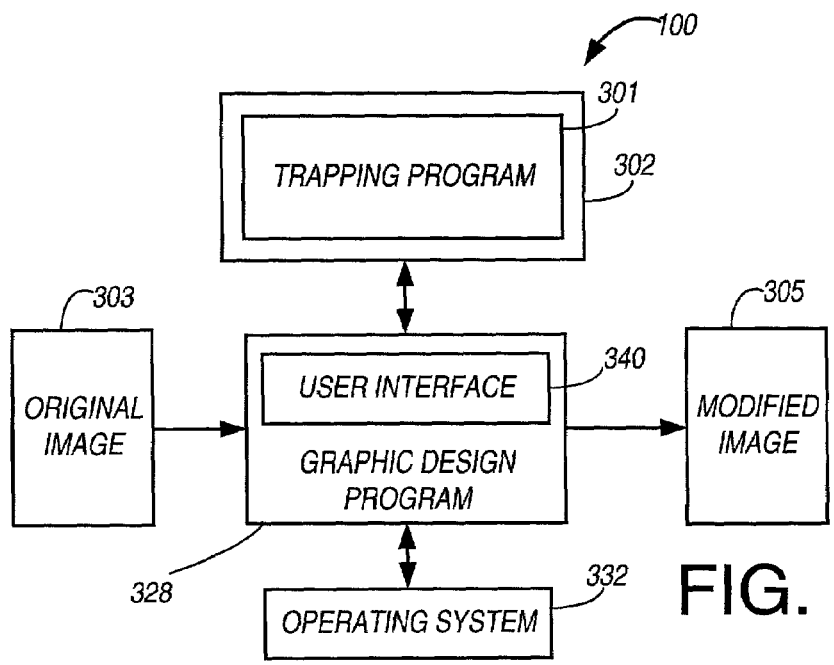
FIG. 3A shows a digital computer implementation of the method as part of a design program.

FIG. 3A shows a graphic design system 300 on which an embodiment of the present invention operates. One embodiment is a method implemented as a trapping program 301 that is part of a graphic design program 328 that runs on a computer processing system 330 such as that shown in FIG. 3B. The computer program may be part of a computer software product (i.e., a carrier medium) 302 that includes one or more code segments that cause a processor such as CPU 334 of processing system 330 to carry out the steps of a method. The graphic design program 328 runs under an operating system 332, and includes a user interface 340 that enables a user to interact with the design program 328. The trapping program 301 operates on an input image 303 and generates a modified image 305 that includes traps.

In one embodiment, design System 328 is a design system for decorative and textile printing, that is, a system for preparing images for printing textiles, wall coverings, laminates (e.g., simulations of wood or marble), party goods such as wrapping paper and bags, greeting cards, and other such items. The invention, however, is not restricted to any particular type of printing or any type of images. In one embodiment, the trapping program 301 operates on an input image 303 that is post-separation, so the image includes components that are the color separations, each separation being a monochrome image. These separations may be in terms of the actual inks used for printing, or spot colors.

The input image may be any type of multi-component image. Examples include images that have cyan, magenta, yellow, and black (CMYK) components, or more than four color components such as encountered in "Hi Fi" printing (e.g., 6 total separations), or may include one or more spot colors or special unconventional inks. For example, wallpaper is printed with 6 special colors, wood simulations are printed with 3 or 4 spot colors depending on the background color, textile and ceramic designs require between 8 and 20 spot colors to obtain the required color ranges and quality. Furthermore, the image may be an indexed color image in which different colors are referred to by different indices.

In one embodiment, each color component of the input image 303 is a monochrome image in a pixel form, with 8-bits per pixel. The invention, however, is not restricted to pixel files, or to 8-bits per pixel. Input image 303 may be in the form of a file on computer system 330, or a block of memory in memory 336, or any other form.

Thus, there is no restriction on the number of color components ("channels") in the image. Also, while one embodiment works with pre-separated images, alternate implementations include using RGB images, or images in some uniform color space such as CIE-Lab, or in some other form. If the goal of trapping is minimizing errors in printable separations, such images would first have to be separated to ensure that the traps only appear in problem areas and not in other areas in the image.

In one embodiment, the internal data of each pixel of each channel is stored as a number from 0 to 255. In one embodiment, this data is translated to data in the range of 0 to 100 when presented to the user interface 340. Similarly, the user inputs data for any pixel by supplying a number between 0 to 100, which is then translated to the internal representation in the range of 0 to 255.

Figure 4:
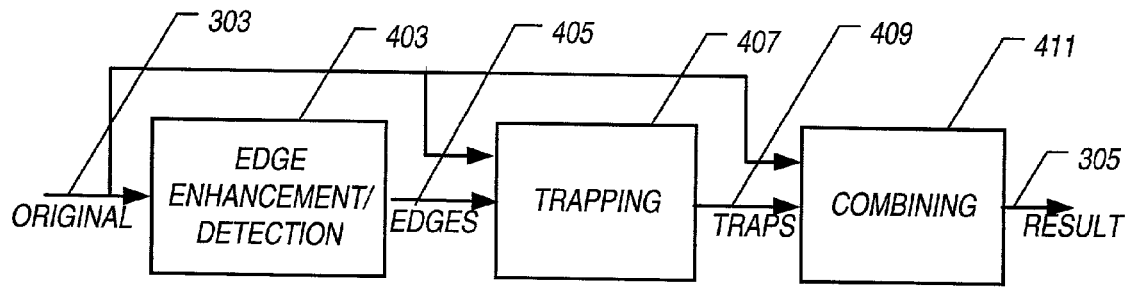
FIG. 4 shows an overview of the method of the invention.

An embodiment of the inventive trapping method is shown in FIG. 4 and includes the following steps. In step 403, the method takes the original image 303 and determines the edges 405 of the image via an edge enhancement/edge detection process 403. The method in step 407 makes trapping decisions including determining the spread colors, using the enhanced edge data 405 and the original image 303. As part of step 407, the method also produces correctly shaped trap areas (traps) 409. In step 411, the method combines the original image 303 with the trap areas 409 to obtain a modified image 305.

In one embodiment, the output at any stage of the process may be modified by the user, typically by the user's interacting with the trapping program using the user interface 340 of the graphic design program 328. Thus, the user may view and manually modify the edges 405, or may modify any properties of the traps 409.

Edge Detection

Figure 5:
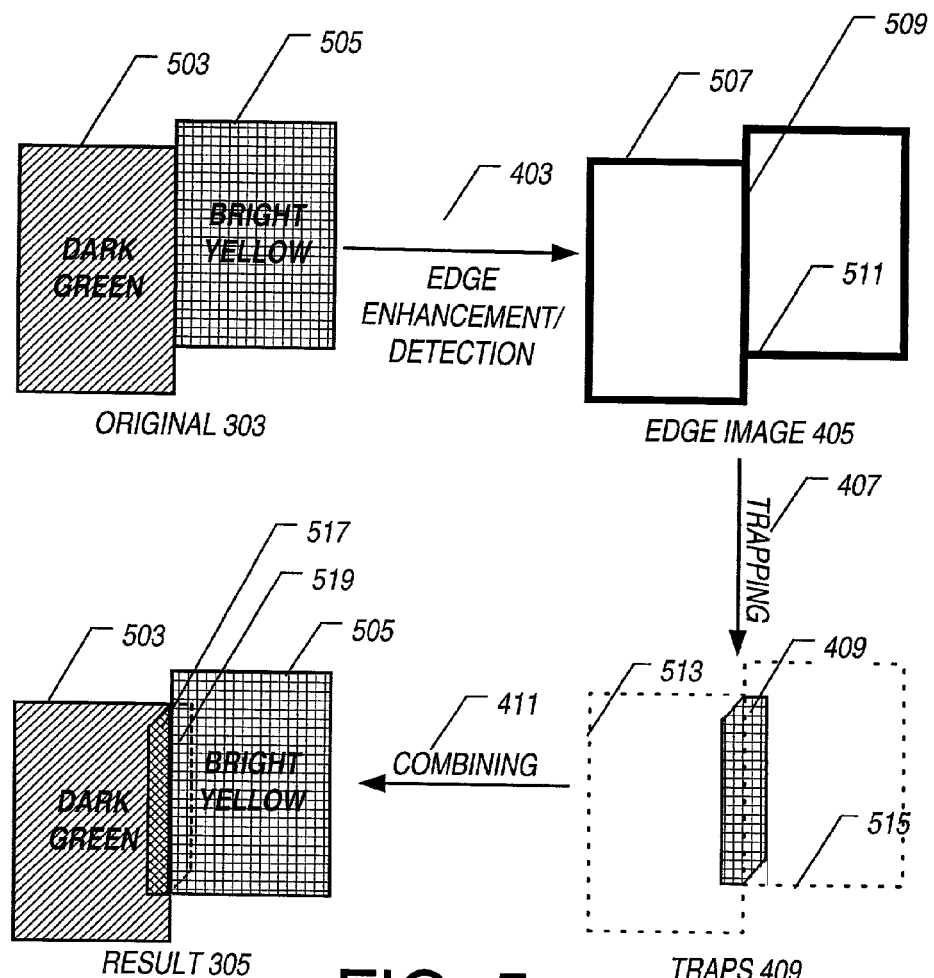
FIG. 5 illustrates the method of FIG. 2 acting on an example digital image.

FIG. 5 shows how the steps of FIG. 4 and their results operating on an image 303 that includes of two rectangular areas 503 and 505 in dark green and yellow, respectively. In the edge detection/enhancement step 403, a separation based edge enhanced image 405 is generated. In one embodiment, the edges are calculated for each individual separation in original image 303. Thus, the edge image 405 has as many channels as the input image 303.

While any edge detection method may be used for this step, one embodiment uses a discrete derivative operator followed by thresholding to determine an edge for the edge detection/enhancement step 403. More specifically, the Prewitt convolution mask is used for edge enhancement, followed by thresholding for edge detection. Two one-dimensional convolutions are performed, one in the horizontal (x-direction) and the other in the vertical (y-direction) direction. For every separation and for every pixel at every x and y, the method computes the maximum of the horizontal (x-direction) and vertical (y-direction) convolution results. The convolution result is shown as edge image 405 in FIG. 5. The convolution result for each separation is then thresholded with a threshold value that is settable by the user. In one embodiment, the threshold has a default value of 5 of a range of 0 to 255 (8 bits). Such a default threshold was found suitable for high quality images with little noise. Edges below the threshold are ignored, while those above the threshold are set to the maximum value. Thresholding suppresses noisy areas and leave out edges that are not steep enough to be trapped. By allowing the user to set the threshold, the user is given some control over the "noise reduction" aspects. If a threshold is set too low, false edges appear, while if a threshold is set too high, parts of the real edges may be missed.

Note that in one implementation, the thresholding operation is included in trapping step 407. Alternate implementations include the thresholding in edge enhancement/detection step 403. Also, while one implementation uses the same threshold for each of the separations, alternate embodiments may use different threshold for each channel.

Edges that are covered by (i.e., beneath) a constant separation are left out. Consider, for example, a cyan square adjacent to a yellow square, both squares covered by a constant magenta rectangle. Without the magenta overlay, the yellow would be trapped under the cyan. However, because of the constant magenta, there is no risk of a visible white gap, and thus, no need for trapping. Only the magenta might show in the gap due to misregistration. In alternate implementations, even such artifacts as the constant separation showing are avoided by also including edges that are covered by a separation.

Once the edges are determined, the viewer may view the edges and modify them prior to the process continuing.

Note that as a result of carrying out edge detection separately for each separation, the edges have a color, resulting from the overprint of the different separations of the edge image. For example, referring to the edges 405 in FIG. 5, edge 507 is dark green, edge 511 is bright yellow, while edge 509 is the combination of bright green and dark yellow. The fact that edge contours of one separation overlap with edge contours of other separations is used further in the method in order to decide on whether a particular pixel is to be trapped, and if yes, with what color.

If the original image were also available in some object-oriented form, the edges would be readily available. Thus, there are many ways of determining the edges of the original image.

Images may be any size, and in one embodiment, the processing is carried out tile by tile, with each tile being a 256 by 256 sub-image, with an overlap in the tiles in order to be able to correctly trap any pixels on a tile boundary. Alternate implementations may scan the whole image line by line, pixel by pixel, or in any other manner.

Trap Area Calculation

In one embodiment, once the enhanced edges 405 are determined, some pixels of these edges are subject to spreading according to a trapping criterion. For each pixel of edge image 405, it is determined whether this pixel location has an edge above the threshold, so that the pixel is an edge pixel, and thus a candidate for trapping, and it is then determined whether to trap the pixel and the spread color for trapping by scanning the neighborhood of the pixel location in the original image 303. In particular, if the pixel is above the threshold, the neighborhood in the original image is scanned for the lightest pixel. This is called the lightness criterion. In one embodiment, this is done by converting the original image 303 to the CIE-Lab-value and then comparing L-values of the pixels surrounding the edge pixel. The size of the neighborhood, in one embodiment applicable for typical resolutions encountered in decorative arts and textile applications is chosen to be 3×3 (8-connectivity). Such typical resolutions fall in the 300–700 dots per inch (dpi) range, but clearly the invention is not limited to a particular resolution. For other resolutions, the size of the neighborhood may be changed by the user, for example, by selecting different sizes experimentally. Note that choosing a neighborhood too large may lead to the trap color in some particular areas being unrelated to the trapping edge and hence incorrect. It is assumed that the image resolution is just high enough to reproduce the finest detail in the image, and from this point of view, the 8-connectivity seems to be a good choice, because bigger neighborhoods would not correspond with the (expected) accuracy of the image.

Note that in the embodiments in which only the luminance (L) value is used, alternate implementations only determine L values or other intensity values. Also, the original image may already be available in Lab or other units such as RGB from which the L value—or some monotonic function of the L value—is easily computed.

Also note that another trap color criterion can be used. Many criteria and methods for determining the trap color are known in the art. See for example, above-mentioned U.S. Pat. No. 5,113,249, incorporated herein by reference, for different trapping criteria. See also U.S. Pat. Nos. 5,323,248, 5,420,702, and 5,481,379. The invention does not require using any particular method of determining whether an edge pixel is to be trapped or, if yes, the trap color.

While in one embodiment, the thresholding is carried out at the same time as the trapping, in alternate embodiments, the edge image may be presented post-thresholding. Furthermore, the edges may already be available, for example as vectors in a linework description.

In one embodiment, the sequence thus is to do the edge enhancement on each separation of original image 303 to generate to edge image 405 of edge image components, each component being 8-bits. The original and edge images are then used to determine the trap. The edge image is scanned tile-by-tile, each tile being 256 by 256, and processed within each pixel by pixel, a line at a time. Each of the separations is processed in turn and the pixel of each separation is thresholded. If a pixel in any separation is an edge pixel, e.g., the pixel exceeds the threshold, one implementation does not also check if that pixel also exceeds the threshold in any other channel. Once a location is deemed to be an edge location, it is determined whether it is a pixel to be trapped by examining the neighborhood of the location in the original image and applying a trapping criterion. If it is a trap pixel, then all pixels within a distance of the location are scanned to determine whether such pixels are to be part of the trap area using the method described herein below. The traps 409 are thus generated as a separate image. A "trap buffer" is thus filled as the trap areas are built.

Note that some images also include an associated mask image that masks the actual image 303. In one implementation, the edges that are described by such a mask image also are trapped. In particular, all the edges in the mask image are trapped with the color of the trap set to the color pixels of the real image being masked that lie just inside the mask borders. This is useful, for example, for an original image that has such low quality that automatic edge detection fails. In such a case, the user creates a mask image that has its borders on those places where the user wants the traps to occur.

Based on the color of an edge, two situations may arise:
1. The edge may be in only one significant color component ("separation" in the case of CMYK). In such a case, there likely is an edge between that one color component and white. For such a case, in one embodiment, the trap color is set to white, for example by setting C=M=Y=K=0.
2. The edge may be in more than one significant separation. In such a case, the trap color that results from the neighborhood scanning (comparing L-values) is used.

Note that the trap color can still be white, when, for example, there is an edge between a two-separation color and white.

The edge pixels that are subject to trapping, i.e., the edge pixels of the trapping edges, are now spread pixel by pixel using a "distance-buffer" (also called a "d-buffer" herein) which is used as a means of spreading the pixels being trapped efficiently and for automatically and rapidly generating the desirable shape for the trap area, including centerline trap shapes and bevel trap shapes. In one embodiment, the d-buffer has the same dimension (in pixels) in the x- and y-direction as the image, and the depth is set to be some number of bits. In one embodiment, the d-buffer has 8-bits per pixel. This number (8) of bits was chosen because it is easy to incorporate into an earlier version of the graphic design program 328. The implementation typically involves pointer arithmetic, and pointer arithmetic is simpler with pixels that have a depth of an integer multiple of byte. For example, with a one-byte depth, the next pixel corresponds with the next byte assuming non-interlaced storage. Non-byte buffers would require more intermediate code for addressing. However, alternate embodiment may implement the invention with any number of bits per pixel in the d-buffer.

In one embodiment, there is one d-buffer for the image, and it is used to indicate how close a pixel is to any edge pixel in any of the channels. As discussed below, alternate implementations may use more than one buffer, for example, a different d-buffer for each trap color in the image. In one implementation, the d-buffer eventually indicates the distance to the closest edge. Therefore, given the x- and y-coordinate of a pixel, a lookup of the d-buffer indicates how close that pixel is to any edge point. In one embodiment, the measure is an inverse measure so that a high value indicates closeness, and a low value indicates being relatively far from an edge pixel. An edge pixel has the highest value, which is 255 in one implementation. Of course alternate embodiments may use a non-inverse measure of distance which increases as the pixel's distance to an edge increases. Any monotonic—not necessarily linear—measure of distance may be used.

The d buffer of an image consisting of a single edge pixel is a pattern that describes a measure of the distance of any pixel from that edge pixel. The maximum distance from that edge pixel in a trap area is the trapping distance. The distance function in the d-buffer of a single point has the shape of a cone, and is called the "point distance function" herein.

In one embodiment, a spread function describing an area around any edge pixel is defined. In general the spatial pattern of the spread function is elliptical in shape centered on the edge pixel, and has maximum horizontal and vertical extents that correspond to the maximum spreads in each direction, i.e., the trapping distances in the x- and y- directions, respectively. For example, the spread function may be a function that is uniform in both x and y, and that has the same maximum extent in x and y, such as the approximately elliptical (in this case, approximately circular) spread function 600 shown in FIG. 6, which extends up to four pixels in either the horizontal (x-) or vertical (y-) direction. In one implementation, the actual spread function extends up to 50 pixels in either direction. The number 50 was chosen because with today's processors, spread values beyond 50 pixels away from the trapping edge may cause computations to take too long. However, in the future, it is envisaged that faster processors will become available, so that larger spreads may be used and computed in reasonable time.

The maximum distance that is significant—i.e., that has a distance measure of more than a minimum value—determines the maximum spread, i.e., the trapping distance. In one embodiment, that minimum value is 1.

The pixels are considered one by one along horizontal scan lines within each tile. All components of each pixel are considered in turn, and then the next pixel is considered. Note that alternative traversal schemes may be used, including, for example, scanning the whole image by horizontal scan lines or any other scheme. Note also that tiles include an extra overlap area with adjacent tiles, with the overlap being the trapping distance, in order to be able to carry out the trapping correctly at tile edges. As the method proceeds, the d-buffer is filled with a value that varies as the inverse of the distance from any edge pixel.

Figure 6:
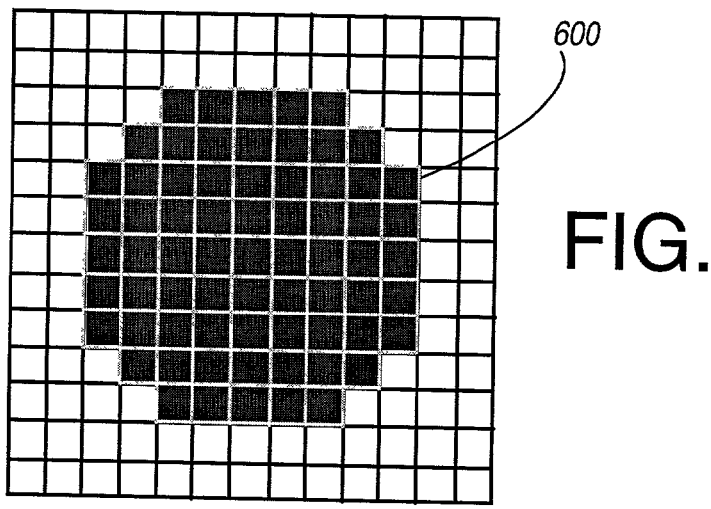
FIG. 6 shows a sample elliptical shape of the spread function according to an aspect of the invention.
Figure 7:
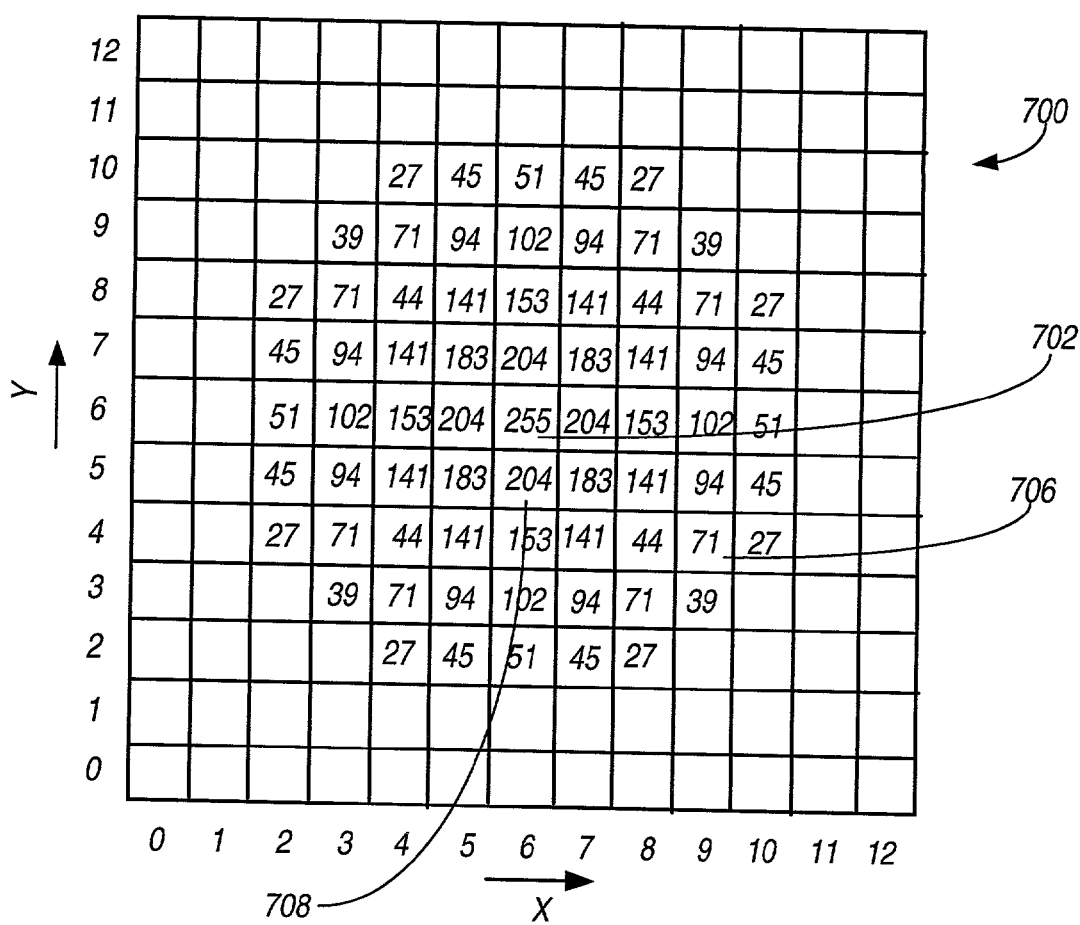
FIG. 7 shows a sample d-buffer of an isolated point corresponding to the spread function of FIG. 6, according to an aspect of the invention.

For the first edge pixel, the spread function is applied in all directions. That is, the components of pixels surrounding that first edge pixel in the trap buffer (a separate image) are replaced with corresponding components of the trap color according to the spread function 600. In addition, the d-buffer is written with the distance measure function, which in one implementation is a conical function, i.e., a value that varies as the inverse of the distance from the edge pixel. The spread function has the same maximum extent as any significant d-buffer values. For example, if the spread function 600 of FIG. 6 is used, the spread function extends up to four pixels in either the horizontal (x-) or vertical (y-) direction in the trap-image 409, and the d-buffer contains the point distance function values 700 shown in FIG 7. Thus, FIG. 7 (the point distance function) shows an example d-buffer 700 corresponds to spread function 600 after a first edge pixel is processed. In this d-buffer 700, a value of 255 is assigned to the edge pixel itself, shown as edge pixel 702.

A value that subtracts the approximate distance from pixel 702 (in 51 units per pixel distance) is set in the d-buffer 700 for every pixel some distance from the edge pixel 602. So the values in either the x- or y-directions are 204, 153, 102, and 51 for the pixels that are respectively 1, 2, 3, and 4 pixels away from edge pixel 702. A pixel such as 706 in d-buffer 700 that is 3 pixels in the vertical direction and 2 pixels in the horizontal direction has a value of 71 (to the nearest integer).

Once the d-buffer for the distance values for the first edge pixel is set, the method proceeds for each other edge pixel by first checking the value in the d-buffer before applying the trap color to any pixel.

Other edge pixels are now considered, with all color components of a pixel considered before moving on to the next pixel. In each case, the pixels surrounding that edge pixel are traversed to determine if they should be subject to spread. Only pixels within the spread function 600 need be considered, since a pixel more than a spread function extent away from an edge will not be spread as a result of closeness to that edge.

Consider a pixel being examined for spreading when traversing pixels close to the particular edge pixel under consideration. Consider for example the case that the d-buffer value for the pixel is lower than the distance measure of that pixel from the edge pixel under consideration, where the distance measure is the same as used in the d-buffer. In such a case, since the distance measure is an inverse measure, this pixel is closer to the edge under consideration than to any previously encountered edge, and the selected trap color can be written in the trap buffer for this pixel, thereby either erasing an already existing trap color, or setting a trap color. In addition, the d-buffer value for this pixel is overwritten with the new distance measure since the edge under consideration is the (so-far) closest edge. If, on the other hand, the d-buffer value for the pixel is higher than or equal to the distance measure of the pixel from the edge pixel under consideration, then that pixel is left unchanged in the trap buffer, as is the d-buffer, since either some other edge in the surrounding area is closer to that pixel, or that pixel is too far from any edge pixel.

Note that the distance measure of a pixel from a point on the edge is the point distance function of the pixel, for the case of the point distance function being centered on the edge point. In accordance to one embodiment, the point distance function is pre-calculated so that only a lookup is required, and in accordance with another implementation, the point distance function is calculated on-the-fly.

When a pixel is set to have a particular trap color, each of the color components of that pixel in the trap buffer is set to the corresponding component of the trap color. When the selected trap color is white, all channels of the pixel in the trap buffer are set to be the value corresponding to white. For example, in the case of CMYK images, when the selected trap color is white, C, M, Y, and K are all set to zero.

Once every edge pixel has been so handled, the trap-image is complete.

Figure 10A:
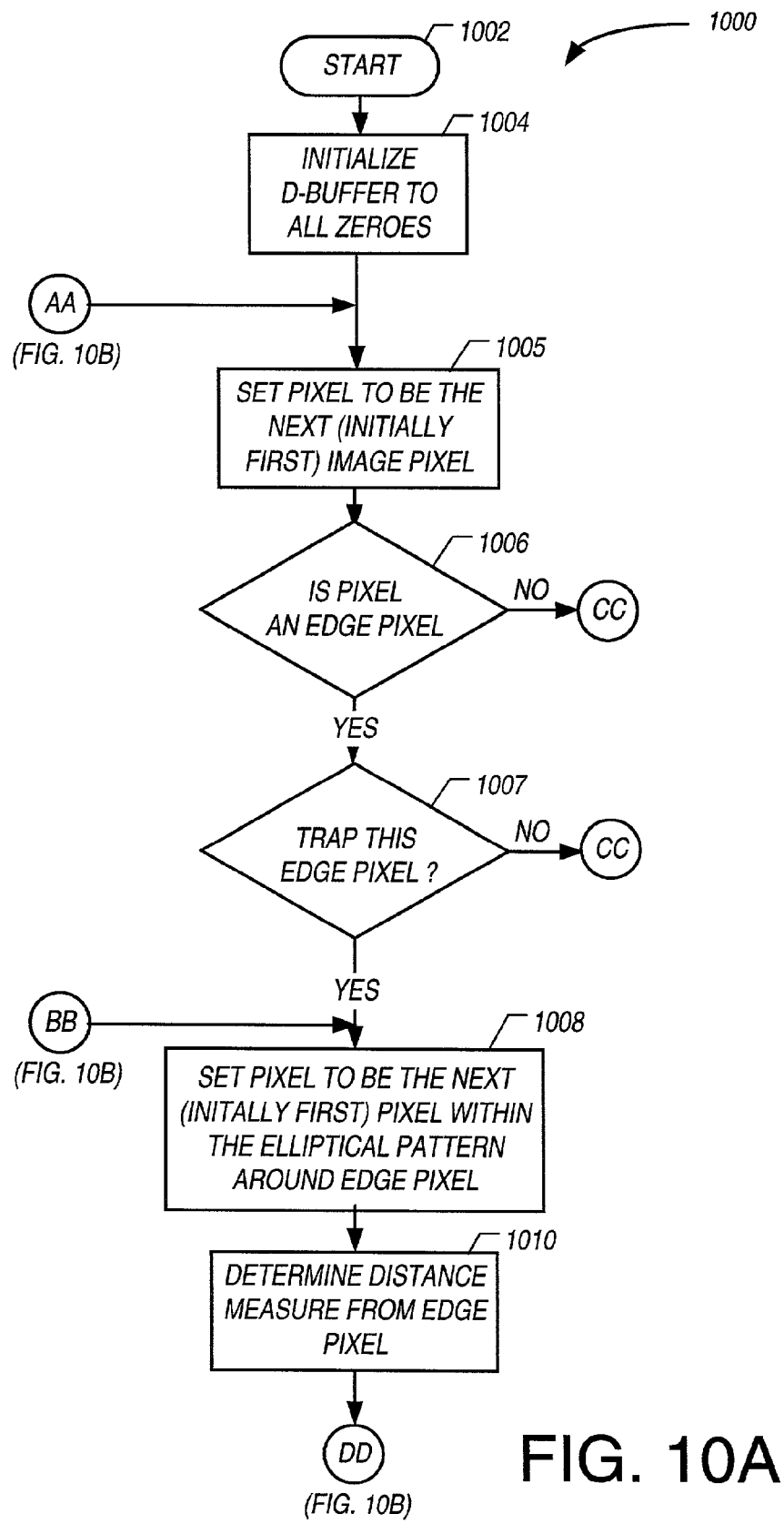
FIGS. 10A and 10B show a flowchart of the method of setting the d-buffer and trap areas in accordance to an embodiment of the invention.
Figure 10B:
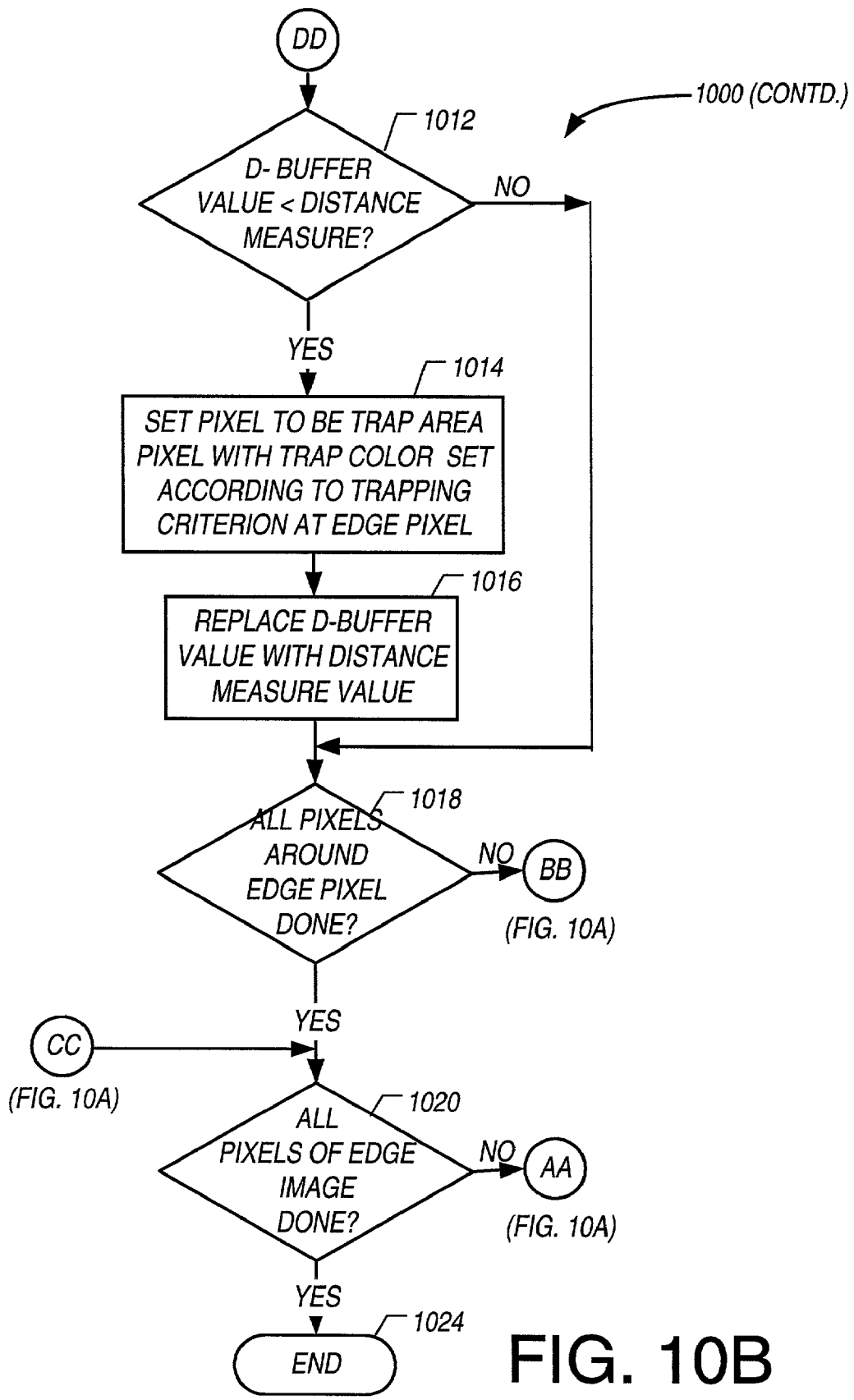

FIGS. 10A and 10B show a flowchart of one embodiment 1000 of the method. Starting at 1002 (FIG. 10A), the d-buffer is first initialized in step 1004 to all zeros, indicating there are (at this stage) no edge pixels. In step 1005, the first pixel of the edge image 405 of enhanced edges is selected. When step 1005 is later carried out, the next pixel of image 405 is selected. In step 1006, each of the color components of the pixel is compared to the threshold to see of the pixel is an edge pixel. If not the process continues in step 1020 (FIG. 10B) to see if all pixels have been traversed. If the pixel is an edge pixel, a determination is made in step 1007 to see if this edge pixel is to be trapped. Then in step 1008, for the selected edge pixel, a first pixel within the spread function 600 extent is selected. Note that when step 1008 is later carried out, the next pixel around the selected edge pixel is selected. In step 1010, the distance measure of the selected edge pixel from the selected edge is determined. This is the point distance function value of the pixel, and may be pre-calculated. Referring now to FIG. 10B, this distance measure is compared in step 1012 to the d-buffer value, and if the distance measure is greater than the d-buffer measure, then in step 1014, the color components in the selected pixel in the trap-image—the trap buffer—is set to be the trap color according to the trapping criterion applied at the edge image, e.g., the 8-neghborhood lightest pixel trap criterion. In step 1016, the d-buffer value is replaced with the distance measure—i.e., with the cone pattern value—for the selected pixel. Steps 1010 through 1016 are repeated for each of the pixels in the region near the selected edge pixel within the spread function. Thus, after step 1016, or, if the d-buffer value is not less than the distance measure of the selected pixel, after step 1010, a test is made in step 1018 if there are more pixels within the pattern 600, and if yes, the method returns to step 1008 wherein the next pixel is selected. Otherwise, once all pixels around the selected edge pixel have been processed, a check is made in step 1020 if all pixels in edge image 405 have been traversed, and if not, the method returns to step 1005 wherein the next pixel in the edge image 405 is selected. Once all pixels of edge image 405 have been traversed, the method ends.

Note that in one embodiment, the spread function 600 is constant, so that the trap areas extend in all directions from an edge, and have a constant color when looking in a cross-section. This is called the "no fade" case. In an alternate embodiment, the trap is not uniform but fades with distance from any edge according to a modulation function. The spread function 600 is not a constant, but includes a fade value as one moves away from the center pixel. The trap color in a trap area is varied according to a modulation factor which is a function of the distance from the edge point. In such an embodiment, when the trap color is set in step 1014, it is reduced in intensity according to the fade value of spread function 600. Any fade pattern may be used. The spread function 600 can be pre-calculated and stored.

Using the d-buffer method provides for rapid traversal of the pixels. There is no need to scan all the pixels of interest and compute their area of influence every time a new pixel is examined. The closest pixel to any edge automatically "wins." In one embodiment, the closest pixel to any so-far encountered edge automatically "wins."

Note that with the d-buffer method, the order of traversal is not important: when a closer edge pixel is found, it imposes itself in the d-buffer and the trap color separation values are updated according to this new pixel.

Blending

Once the image of traps is determined, the trapped image is generated by blending the original image and the trap-image together. For every separation of every pixel, the maximum of the original and trap-image is calculated. Note that when the objects are uniform in color, one half of the traps disappears, because the trap color there is the same or even lighter than the color in the original image.

FIG. 11 shows pseudocode for the complete trapping method, including edge enhancement and combining.

Features of the Method

The d-buffer method automatically generates centerline and bisector (i.e., beveled) trap areas. With centerline trapping, the trap areas are limited to be the minimum of the trapping distance away from the edge being trapped, and the center-line between the trapped edge and any other edge. Thus, trap areas becomes smaller as they approach other edges. At ends of the trap areas, the boundary of the trap areas follows the bisector, so provides "beveled" trap areas.

Figure 1A:
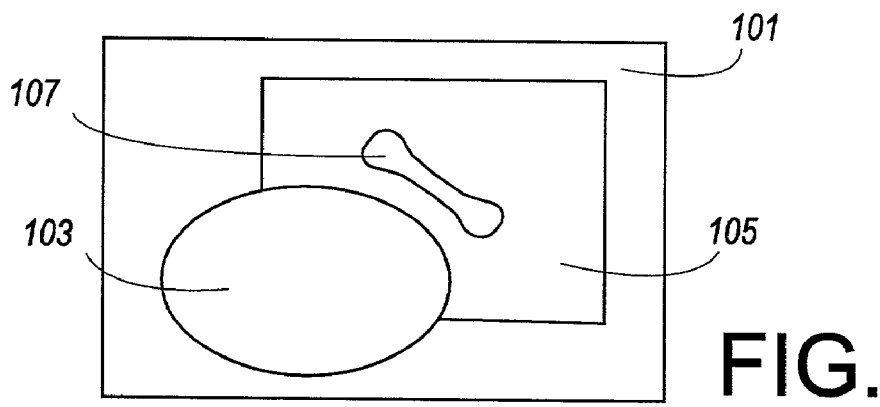
FIG. 1A shows a simple original image prior to trapping.
Figure 1B:
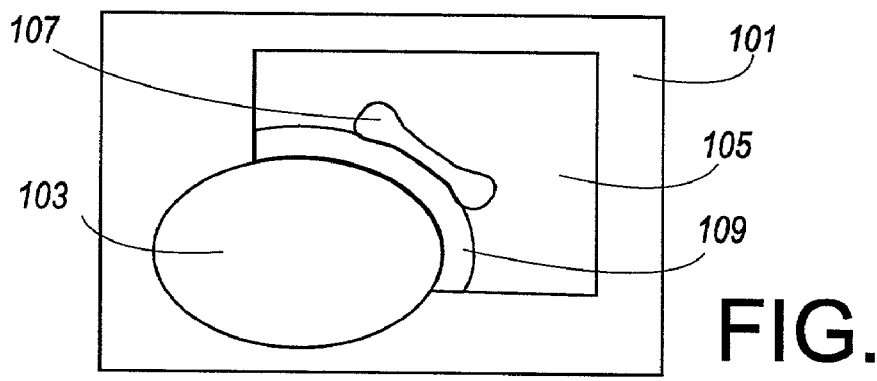
FIG. 1B shows the image of FIG. 1A after on-edge trapping.
Figure 1C:
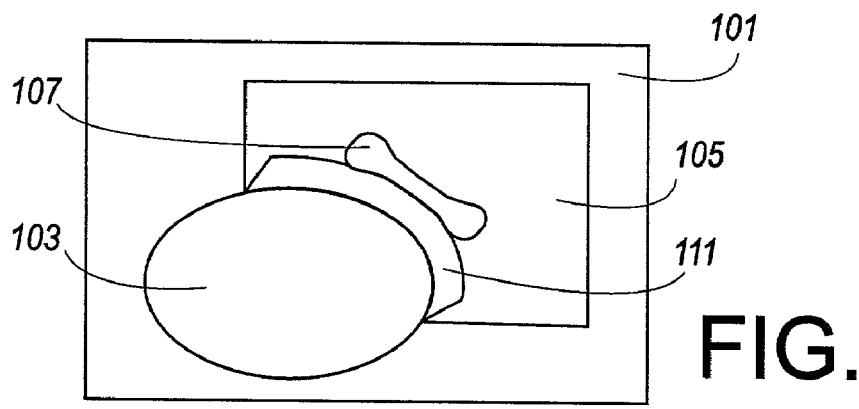
FIG. 1C shows the image of FIG. 1A after bevel (or bisector) trapping.
Figure 1D:
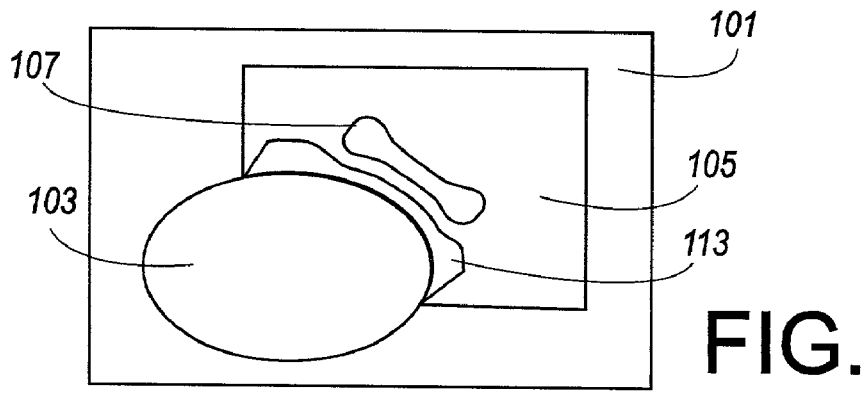
FIG. 1D shows the image of FIG. 1A after centerline trapping as achieved by the method of the invention.
Figure 2A:
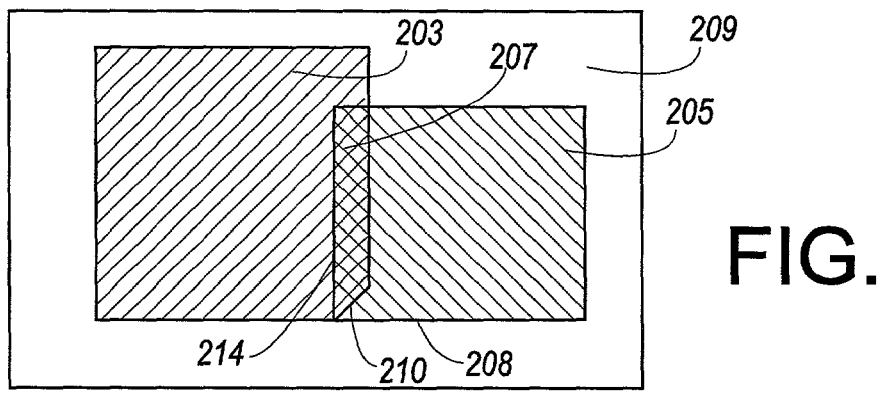
FIGS. 2A, 2B, show two more examples of beveled trapping as achieved by the method of the invention.
Figure 2B:
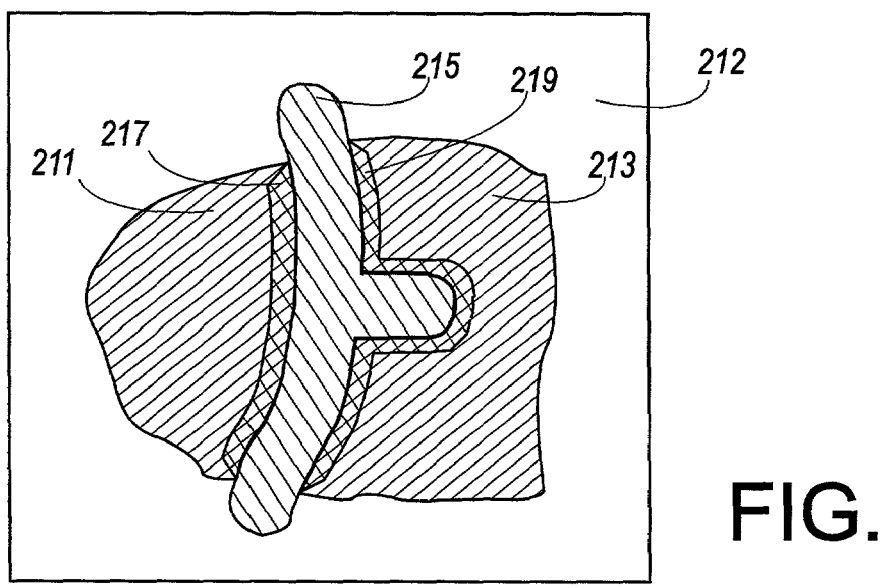
Figure 2C:
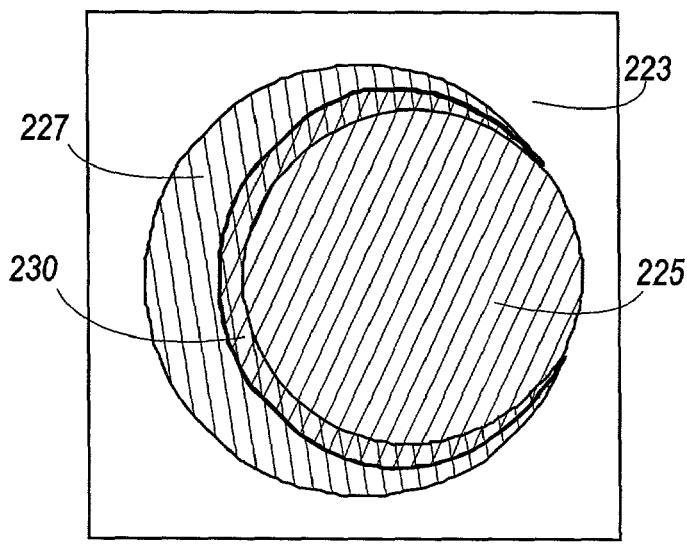
FIG. 2C, shows another example of centerline trapping as achieved by the method of the invention.

When "no trapping towards white" is set, the trap shapes are beveled near white areas. See FIGS. 1 and 2 for examples.

Figure 9:
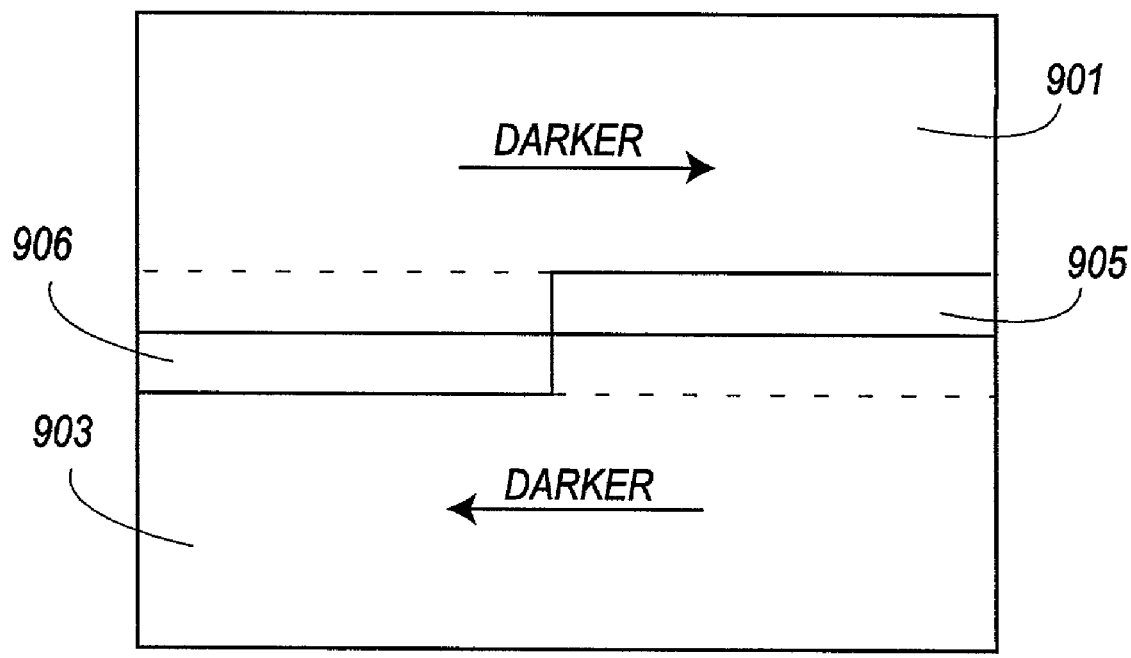
FIG. 9 shows an example of a trapping between two vignettes in accordance to an embodiment of the invention.

By using the d-buffer, the trap color is locally dependent, and so may vary in a given trap region. Consider the example shown in FIG. 9, which shows two abutting vignette regions 901 and 903. Vignette filled object 901 is pink in color and proceeds from white at the extreme left to very light pink to full dark pink in the direction of the arrow shown. Vignette filled object 903 is sky blue in color and proceeds from white on the extreme right to very light blue to dark sky blue in the direction of the arrow shown. With the trapping method embodiment described herein, the color of trap locally depends on the difference in L value of the colors on either side of the trapping edge, and so, at the right, when the color of area 903 is lighter than that of area 901, the trap region has the color of object 901 and, after blending, produces region 905. At some point top object 901 becomes the lighter of the two, and the trap region takes on the color of the object 901. Thus, the trap region to the left is visible as area 906.

Note that such locally dependent trap color is easy to achieve using embodiments of the present invention where trapping decisions are made locally.

Another feature of one embodiment of the inventive method is that a separate trapping image 409 is obtained which can be blended with the original image. This trap-image 409 is separately editable. It also provides for easily varying the trap colors. For example, the same design may be used with different color combinations (called "colorways" in the decorative arts). That is, the same set of separations may used to create lots of different images by assigning other inks to the separations. In this case the edge image 405 and trap-image 409 remain constant, with only the trap colors differing according to the trapping criterion used (lightest pixel in the neighborhood, in one implementation). So for the specific case of making colorways of a particular design, once the traps are determined for one color combination, trapping for another colorway only involves trap color determination. The same trap-image is used.

In some embodiments, the inventive trapping method also provides for direction dependent trapping. By varying the shape of the spread function, a user can specify the trapping dimensions both horizontally and vertically. This would be applicable, for example, for trapping for printing techniques for which the expected misregistration is larger in one direction than the other. Then the trapping distance for that direction can be increased. Even when a diagonal misregistration is expected, the point distance function values can be recalculated to yield a certain diagonal trap thickness.

Note that when different trapping distances are chosen in the x- and y-directions, bevels at the end of trap areas no longer follow the bisector of the angle between edges.

In some embodiments, the inventive trapping method also provides for trapping by fading away from the trap edge. In this case, non-constant spread function (trap fade profile) is used. Since the distance from the edge pixel is known for every pixel that gets a trap color (called the "point distance function" herein), the separation values may be modulated with a particular trap fade-profile curve, which may be user defined. This fade-profile curve describes the modulation factor of the trap color in a trap area as a function of the distance from the edge. Note that each separation can have a different modulation factor, leading to the fade-profile curve (the spread function) being color or separation-dependent.

One embodiment of the method is implemented in a trapping program 342 as part of a graphic design program 328 (FIG. 3). The trapping program carries out all steps of the method automatically. An interactive mode also is available, wherein fine-tuning steps are provided for the user to modify any of the intermediate results. For example, the edge image may be cleaned up after step 405 by removing isolated spots before continuing with the method. Additionally, the trap-image 409 may be modified to remove certain unwanted traps prior to combining step 411.

Use of Multiple D-buffers

Figure 8:
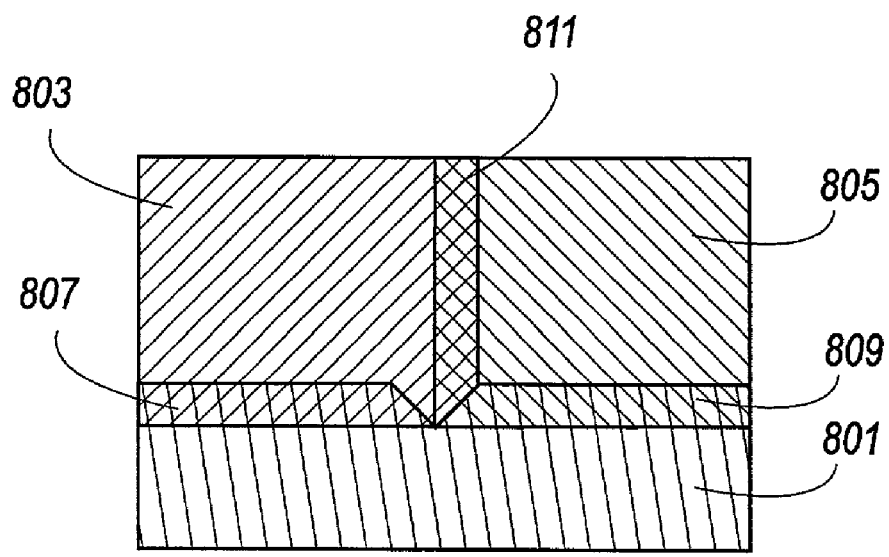
FIG. 8 shows an example of a "triple point"—the point where three colored areas come together—and an artifact produced in accordance to one embodiment of the invention.

In one embodiment, one d-buffer is used for the whole image and it eventually contains the distance from any edge in any color component (channel or separation). The one d-buffer determines the trap color based on the "winning" nearest edge pixel. Using only one d-buffer per pixel saves memory. However, using only one d-buffer has one undesired effect near what is called a "triple point," which is the point where there are three adjacent separations. A similar effect occurs when there are more than three adjacent separations. With the one d-buffer and the "winning" nearest edge pixel strategy, a trap area from one separation does not extend under the edge of the two other separations. This is illustrated in FIG. 8, in which there are three objects, which are, in decreasing order of luminance L, yellow object 801, light blue object 803, and pink object 805. The trap areas generated as described above with one d-buffer are shown as yellow trap area 809 (leading to an orange region), yellow trap region 807 (leading to a light green region) and light blue trap area 811, leading to a purple region. It is desired that the region 807 together with region 809 be a rectangular area instead of having a gap in the middle. If, for example, there was a misregistration of the 801 separation downwards, a white spot could become visible because of the gap. Note that FIG. 8 only shows a clipping of a larger image in which all areas extend in both the horizontal and vertical directions.

In an improved implementation, more than one d-buffer is used. When only one d-buffer is used, all edge information (edge sphere of influence) is kept in concentrated form in the one d-buffer, and all edges compete with each other. Using multiple d-buffers and having a corresponding trap-image for each d-buffer enables the trap area of an edge to compete with only a subset of the other edges. This can result in overlapping trap areas, which is desirable, for example, at a triple point. It also enables trap areas unbounded by some centerlines.

According to the multiple d-buffer embodiment, for each pixel around each edge, several d-buffers, forming a subset of the total, are examined, their values replaced and the trap color written into corresponding trap buffers in accordance to the above described method of comparing the distance measure for pixels around an edge with the d-buffer value for that pixel. Note that as is commonly understood, the term subset includes any or all of the total. The several resulting trap buffers are all blended with the source image (using a maximum "overprint" rule). The number of d-buffers and associated trapping buffers determines the way one processes any specific type of edge.

In a particular version, a d-buffer and trap-buffer is used for each trap color. This version clearly is limited by the amount of memory available for the buffers, and is most applicable to an original image that has a limited number of colors. The trap buffers are each binary with one bit per pixel since a single trap color is associated with each such trap buffer. An edge to be trapped with a particular trap color (e.g., lightest color of two adjacent regions), writes its distance information in the d-buffer associated with that trap color. When a pixel is overwritten, that trap buffer pixel is set to 1. Every other d-buffer that is associated with a lighter trap color is written with the same distance information, but with its trap buffer value set to 0 when the pixel is overwritten. All d-buffers of darker trap colors are left untouched. An edge bounding a white region is considered to have a white (lightest) trap color. However white does not need a d-buffer and trap buffer of its own.

In a single trap buffer of a certain trap color, the edges with that trap color (the pixels with a 1) compete with all edges with darker trap color (pixels with a 0). The result is the trap region for this color.

Figure 12A:
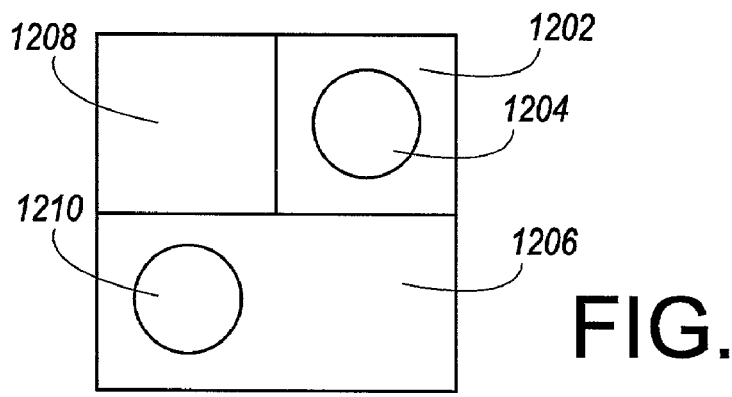
FIGS. 12A, 12B, 12C, and 12D show an original image, two trap areas, and the resulting combined image according for a sample image containing a triple point according to a multiple d-buffer embodiment of the invention.

The overall result in each trap buffer of a particular trap color is the area of influence of all edges with that trap color, competing with all other edges with darker trap colors. This is illustrated with the aid of FIG. 12. FIG. 12A shows an original image with three colors: a red region 1206, a blue region 1202, a second circular blue region 1210, and a yellow region 1208. Region 1204 is white. According to the lightness criterion, there are two possible trap colors, yellow and red. Blue is not a trap color since there is no darker color in the image.

Figure 12B:
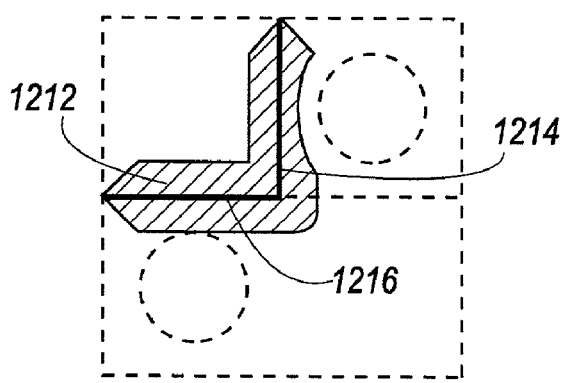

FIG. 12B shows the trap buffer associated with the yellow trap color. The solid lines 1214 and 1216 show the edges with trap color yellow and their area of influence. Other edges are shown in dashed lines. The hatched area 1212 is the resulting trap area stored in the yellow trap buffer.

Figure 12C:
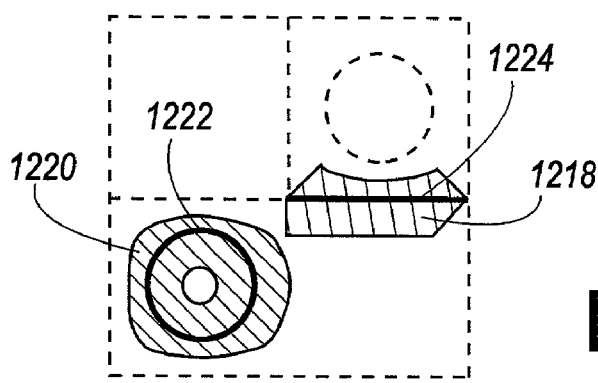

FIG. 12C shows the trap buffer associated with the red trap color. The solid lines 1222 and 1224 show the edges with trap color red and their area of influence. Other edges are shown in dashed lines. The hatched areas 1218 and 1220 are the resulting trap areas stored in the red trap buffer.

Figure 12D:
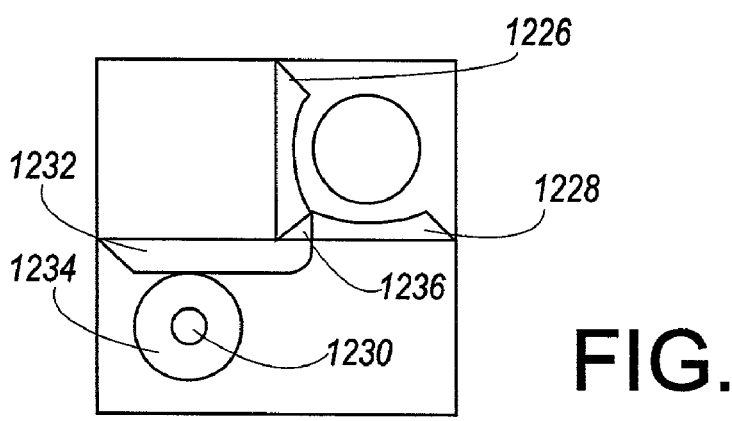

FIG. 12D shows the final image after combining. Note that the part of trap area 1212 that combines with yellow area 1208 is not visible. Similarly, the parts of red traps 1218 and 1220 that overlap with red region 1206 are not visible. Note also the triple point in the center of the image, in particular the area 1236 where the yellow trap 1212 and red trap 1218 overlap. The visible traps are 1232 which is seen as the combination of yellow and red, 1228 which is seen as the combination of blue and red, 1226 which is seen as the combination of yellow and blue, and 1236, which is seen as the combination of yellow, blue and red.

Note also how the red and yellow trap areas avoid the white disk region 1204, but do not avoid the blue disk region 1210 because edge 1222 of the blue disk has a red trap color, which is darker than yellow.

Implementation Using a z-buffer

Z-buffers are known in the field of computer graphics. Like a d-buffer, a z-buffer is a block of memory having the same resolution and extent as the image data. The conventional use of a z-buffer in computer graphics is for hidden surface determination when rendering three dimensional image data into a two dimensional view. See for example, U.S. Pat. No. 4,475,104. In particular, a z-buffer is used for the rapid determination of which pixels to display and which pixels are hidden behind other surfaces when rendering a three-dimensional model of several surfaces into two-dimensions. In such an application, the z-buffer stores the depth value for each pixel in the image. When rendering a surface, for example a 3D object, for display, a z-value is calculated for each pixel and stored in the z-buffer location for that pixel. The lower the z-buffer, the closer the surface is to the viewer of the display. When a pixel (i.e., x, y location) of some new object is rendered, it's z-value is compared to the stored z-value for that pixel location, and only if the z-value of the new object's pixel is less than the one already stored will the new pixel be displayed (e.g., written into a display buffer), and its z-value replace the existing value in the z-buffer.

Modern hardware devices for computer graphics, for example, hardware graphics accelerators, include hardware z-buffer implementations. A hardware z-buffer is a buffer of special random access memory (RAM) that performs a test every time a pixel is written in the buffer. A pixel typically includes a color value in terms of color components (e.g., RGB or RGBA) along with a number in the form of a byte or integer that describes the depth of the pixel in a 3-D space, this number is called the z-value. The existing color channel values and z-value in the z-buffer is overwritten with new values if the z-value of that pixel is higher/lower (depending on the implementation) than the existing z-value.

In another embodiment of the invention, such a z-buffer is used to implement the d-buffer trapping method. A z-buffer is used differently from its normal 3-D rendering to perform pixel trapping. A typical z-buffer can only accommodate a limited set of color components—three for example for RGB images—while the original image 303 that needs to be trapped can have any number of channels. In one embodiment, to accommodate more channels, the z-buffer is divided into different parts, each taking up the number of channels of the trapping image. For example when the original image 303 has 9 channels, the z-buffer is divided into 3 parts. Note that there is some redundant information; the z-value will be available in all parts of the buffer. This redundant z-buffer information, however, is used for every write operation in every part of the buffer.

The trap-image builds up in the z-buffer while the pixels of the edge image are scanned to determine if they are edges, if they are subject to scanning, and if yes, written to the z-buffer if their distance measure is closer than any other edge, this last step using the hardware to make the comparison. When all pixels of the edge image have been scanned and thus have placed their respective point distance functions in the hardware z-buffer, the trap-image is complete and in the z-buffer. The contents of the z-buffer are then combined with the original image, in one embodiment using "overprint blending," that is, using the simple maximum formula. This results in the final trapped image.

In yet another embodiment, a hardware z-buffer is used to optimize the placing of the point distance functions, including both the z-buffer value and the color components. A section of the z-buffer memory is reserved, and the point distance function is pre-calculated and written into this reserved section. For every edge pixel, this pre-stored point distance function can be used as a "stamp". Only the color and the coordinates where the stamp has to be placed need to be specified. The z-buffer hardware itself takes care of the correct "stamp placement" which is faster than individually placing every pixel of the point distance function.

In one "stamping" step, one can first fill the color component area with the trap color using, for example, a clear command, for example, clear (R, G, B, change z-buf=no) and then use a block transfer operation such as a BitBlt ( ) call, for example, BitBlt (X, Y) to impose the point distance function at a certain spot defined by X and Y. Note that a block transfer command such as a BitBlt call is typical in graphic display architectures, including that application programming interface (API) for Microsoft Windows® (Microsoft Cooperation, Redmond, Wash.).

In an alternate implementation the point distance function could be constructed using a limited set of triangles in a fan-like structure, thereby assigning each corner point a given color. This would also allow making the "trap fade" implementation when the top of the point distance function gets the highest value and the other point gets the lowest value. The graphic system then renders the point distance function automatically. In such an implementation, a bitbit ( ) call places the point distance function at a certain location.

Alternate Embodiments

Several other alternate embodiments also are possible, including embodiments having the following features:

Non-pixel Files

While one embodiment is for images that are defined as pixel files of separation, the original image may alternately include linework defined in some object oriented description such as PostScript® (Adobe Systems Inc, San Jose, Calif.) or GRO™, the native format of Barco Graphics, of Gent, Belgium, the assignee of the present invention. The edges between different linework objects are predefined in such descriptions, for example as vectors or other linework objects according to some geometric descriptions. Such edges are called edge line objects herein. In accordance to one alternate embodiment, the method proceeds similarly to the embodiment described above for edges defined in pixels, except that the trap area is generated in the region surrounding an edge which may be a distinct edge line object or a set of pixels. The original image need not be defined as having pixels. The trap area surrounding any point in the edge however is generated in pixel format. An edge point on the edge line object needs to be definable in the same coordinate system (the same raster) as the pixels of the trap area, such that a distance measure provides an indication of the distance from the edge in the original image (whether in pixel form or not) to the pixel location in the neighborhood of the edge point.

With edges available as edge line objects, the distance of any pixel from an edge line object may be readily calculated from the geometric description of the edge line object. For example, suppose the image file includes a 100% cyan background, a white disk, $D_w$ centered at $(x_w, y_w)$ having a radius $R_w$, and a 100% magenta disk $D_m$, centered at $(x_m, y_m)$ having a radius $R_m$. Consider a pixel location (x, y). The distances of the pixel (x, y) from the white and magenta disks, denoted $d_w$ and $d_m$, respectively may be readily obtained from the geometric descriptions of the disks. In particular, $d_w$ and $d_m$ are $$d_w = \text{sqrt}\{(x-x_w)^2+(y-y_w)^2\}-R_m, \text{ and}$$

$$d_m = \text{sqrt}\{(x-x_m)^2+(y-y_m)^2\}-R_m, \text{ respectively.}$$

Thus, given distances are readily calculated using the geometric descriptions.

For cases wherein line edge objects are provided, the method loops over all edge line objects, one at a time. For each pixel within the trapping distance of the edge line object, for the first edge line object considered, the method uses the geometric description to set the distance buffer and set all pixels with the trapping distance as trapping pixels. For each edge line object after the first, for each pixel within the trapping distance of the edge line object, the method uses the geometric description of the edge line object to determine if the pixel is closer to the edge line object than to a value stored in the d-buffer that indicates the distance of the pixel to any previously encountered edge line object. If the pixel is closer (or this is the first edge line object examined), the method sets the pixel as a trap pixel of a trap region having a color determined according to a trapping criterion applied to the neigborhood of the edge line object. The method also stores the distance in the d-buffer to override the previous distance value.

Since typically, for every pixel the number of edge line objects within the trapping distance, i.e., that can influence that pixel, is limited, every pixel is handled typically fewer times than in the case of the edge provided in the form of a set of pixels. Only when the number of objects is very high would one consider converting the edge line objects, which may be in the form of a vector file, to pixel format prior to applying the method of the invention.

Thus, the claims appended hereto are written in terms of edges which may be edge line objects or a set of edge pixels.

Separation/Color Dependent Trapping

In an alternate embodiment, different d-buffers (and different trapping distances) can be used for different color separations and even for different colors. This provides for separation or color-dependent trapping, and also provides for avoiding the triple-point artifact described above.

Keepaway Generation for Implementing Chokes

The above description is for a system that performs trapping by spreading one area towards another. When misregistration occurs, the edges between a region of any nonwhite color and a white region may show edges of any single separation that is not in overprint with any other separation. When any such single separation is very pronounced, it is usually desirable to "choke" the region to reduce the detrimental effect of the misregistration. The d-buffer can also be used for this purpose. Rather than, or in addition to an image of traps, an image of keepaways is generated containing the "keepaways". These can be implemented as amounts to be subtracted from the original image. Also an extra buffer with one bit per pixel will be necessary to store the information of whether to trap or to keepaway.

Using Trap Color Selection Criteria

Instead of using the L-value as the determining factor for the trap color, the user could specify preferential trap colors and make decisions on where not to trap based on the neighboring colors. Many trapping criteria are known in the art, and the method of the invention may incorporate such alternate criteria.

Implementation on a Processing System

Figure 3B:
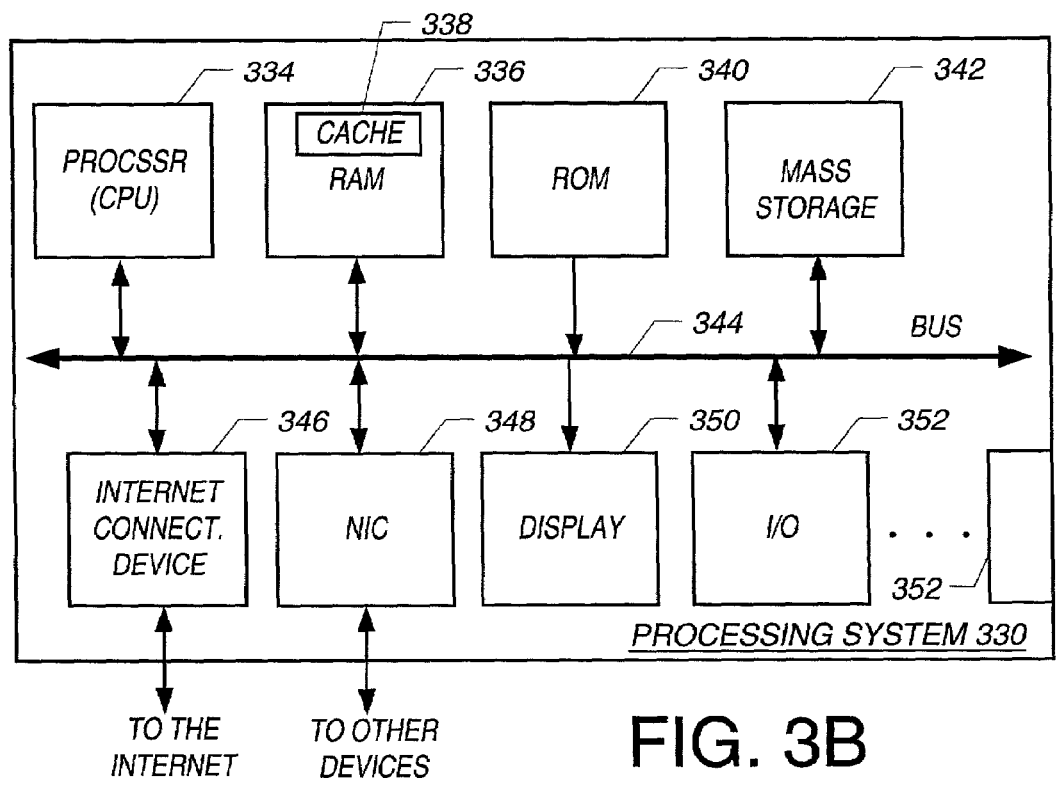
FIG. 3B shows a typical processing system on which an embodiment of the present invention may be implemented.

The computer system 330 shown schematically in FIG. 3B is a processing system that typically has a configuration of one or more standard computer systems (in general "processing systems"). A typical processing system 330 may include a bus 344, processing unit (processor, CPU) 334, memory (e.g., random access memory, RAM) 336, read only memory (ROM), a cache 338, a mass storage device 342, an Internet interface, a network interface card (NIC) 348, a display, and various other input/output devices. The mass storage device 342 may include a magnetic, optical, or other equivalent storage medium. The Internet connection device 346, if included, may be any device used to connect to the Internet, and exemplary connection devices include, but are not limited to: a modem, a digital subscriber line (DSL) modem, a cable modem, an optical connection device, a T1 interface, a T3 interface, an E-1 interface and an E-3 interface. The input/output devices may include a pointing device such as a mouse and a keyboard.

A data processing system such as processing system 330 also may include application programs, operating systems, data, etc., which are not shown in FIG. 3 for the sake of clarity. It also will be understood that such a data processing system may also include numerous elements not shown, such as disk drives, keyboards, display devices, network connections, additional memory, additional processing units, LANs, input/output lines, etc. For example, the processing system 330 may actually include multiple physical and logical devices connected in a distributed architecture. Accordingly, the network interface card 348 is used to provide data communication with other devices that are part of processing system 330.

As will be appreciated by those skilled in the art, embodiments of the present invention may be embodied as a method, an apparatus such as a data processing system, or a carrier medium, e.g., a computer program product carrying code segments that instruct a processor to implement steps. Accordingly, the present invention may take the form of an entirely hardware embodiment, an entirely software embodiment or an embodiment combining software and hardware aspects. Furthermore, the present invention may take the form of carrier medium, e.g., a computer program product on a computer-readable storage medium having computer-readable program code embodied in the medium. Any suitable computer readable medium may be used including a magnetic storage device such as a diskette or a hard disk, or an optical storage device such as a CD-ROM.

It will be understood that the steps of methods and flowcharts discussed are performed in one embodiment by an appropriate processor such as processor 334 of the processing system shown as processing system 330 executing instructions (code segments) stored in storage 342. Thus, the steps in the flowchart may be replaced by means for carrying out the steps, such means including one or more processors. It will also be understood that the invention is not limited to any particular implementation or programming technique and that the invention may be implemented using any appropriate techniques for implementing the functionality described herein. The invention is not limited to any particular programming language or operating system.

The instructions (computer readable code segments) in storage 342 may be read from storage into memory 336. Execution of sequences of instructions contained in memory 336 causes processor 334 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor such as processor 334 for execution. Such a medium may take many forms, including but not limited to, non-volatile media, volatile media, and transmission media. Non-volatile media includes, for example, optical or magnetic disks, such as a storage device which is part of mass storage 342. Volatile media includes dynamic memory such as RAM 336. Transmission media include coaxial cables, copper wire and fiber optics, including the wires that comprise a bus within a computer, such as bus 344. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infrared signal. An infra-red detector coupled to a bus can receive the data carried in the infrared signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Thus it will be clear to those in the art that various modifications are possible to the illustrative embodiments described herein. Such embodiments are therefore not to be considered as limiting the scope of the invention, which is described by the claims attached hereto.

What is claimed is:

1. A method for generating a trap pixel of a trap area surrounding one or more trapping edges of an image, the method comprising:
    for each trapping edge in the image, for each pixel within a predefined area around the trapping edge,
        comparing the distance of said each pixel from the trapping edge according to a distance measure with a provided measure indicative of the distance of the pixel from any edge of the image to determine if said each pixel is closer to the trapping edge than to another edge; and
    if said pixel is closer to said edge than to any other edge, setting the pixel as a trap pixel of the trap area, including setting a trap color for the trap pixel.

2. A method as described in claim 1, further comprising:
    determining the trapping edges of the image by applying a trapping criterion to a neighborhood of each edge of the image.

3. A method as described in claim 2, further comprising:
    determining the edges of the image.

4. A method as described in claim 2, wherein at least some of the edges of the image are provided so that edge detection is not required for the provided edges.

5. A method as described in claim 1, wherein the provided measure is contained in a pixel buffer indicating for any pixel how close that pixel is to any edge, and wherein the distance comparing includes comparing the distance measure of said each pixel to the value in the pixel buffer,
    the method further comprising,
    if said pixel is closer to said edge than to any other edge as indicated by the comparison, replacing the value in the pixel buffer with the distance measure of said each pixel from the trapping edge, such that the pixel buffer converges to indicating the closest distance of any pixel to any edge,
    any traps generated around the trapping edges thereby being centerline traps.

6. A method as described in claim 1, wherein the trap color is user-provided.

7. A method as described in claim 1, wherein the trap color is determined according to a trapping criterion applied to a neighborhood of the trapping edge.

8. A method as described in claim 7, wherein the trapping criterion compares the lightness of the pixel to the lightness in the neighborhood.

9. A method as described in claim 1,
    wherein the distance a pixel from an edge point according to the distance measure defines a point distance function centered on the edge point, the maximum extent of the point distance function from the center defining a trapping distance,
    wherein the point distance function is pre-calculated, and
    wherein the distance comparing includes determining the distance of said each pixel from the trapping edge using the point distance function.

10. A method as described in claim 1,
    wherein the distance comparing includes determining the distance of said each pixel from the trapping edge by calculation on the fly.

11. A method as described in claim 1, wherein the extent of the predefined area around a trapping edge point defines a trapping distance, and wherein the trapping distance from any point on an edge varies as a function of direction from the point on the edge.

12. A method as described in claim 1, wherein the trap color of any trap pixel is modulated by a modulation factor, the modulation factor being a function of the distance from the trapping edge.

13. A method as described in claim 1, wherein at least some of the edges are defined by an edge line object having a geometric description, and wherein said comparing step includes determining the distance of said pixel from an edge using the geometric description of the edge line object for any edge defined by an edge line object.

14. A method as described in claim 1,
wherein at least some of the trapping edges are defined by a set of edge pixels, the method further comprising carrying out the steps of comparing and conditional trap pixel setting for each edge pixel of any edge defined by a set of edge pixels,
such that the method comprises,
for each edge defined by edge pixels, for each pixel within a predefined area around the edge pixel,
comparing the distance of said each pixel from the edge pixel according to the distance measure with a provided measure indicative of the distance of the pixel from any edge of the image to determine if said each pixel is closer to the edge than to another edge; and
if said pixel is closer to said edge pixel than to any other edge, setting the pixel as a trap pixel of the trap area, including setting a trap color for the trap pixel.

15. A method as described in claim 14, wherein the comparing compares the distance of said each pixel to the value stored in a pixel buffer containing at each pixel location the distance measure of that pixel location to the nearest so-far encountered edge pixel of the image, and setting the trap pixel in said conditional trap pixel setting step further includes replaces the value stored in the pixel buffer with the distance measure for the pixel,
the method thereby generating a centerline traps around the edge pixels.

16. A method as described in claim 15, wherein the pixel buffer is in a z-buffer such that the comparison step and conditional replacement step are automatically carried out.

17. A method as described in claim 15, further comprising:
determining the edge pixels of the trapping edges by applying a trapping criterion to pixels of one or more edges of the image.

18. A method as described in claim 15, further comprising:
determining the edge pixels of the one or more edges by edge detecting the image.

19. A method as described in claim 18, wherein the edge detecting includes edge enhancing the image and thresholding the results of enhancing.

20. A method as described in claim 15, wherein the setting of a trap pixel sets the pixels of a trapping image, the method further comprising:
combining the image with the trapping image to form a trapped image.

21. A method as described in claim 14, wherein the comparing compares the distance of said each pixel to the values stored in a subset of a plurality of pixel buffers, each containing at each pixel location the distance measure of that pixel location to the nearest so-far encountered edge pixel of the image, each pixel buffer having an associated trapping image, and
wherein setting the trap pixel in said conditional trap pixel setting step further includes replaces the value stored in each pixel buffer of the subset with the distance measure for the pixel, and setting a pixel of each associated trapping image associated with each pixel buffer of the subset.

22. A method as described in claim 21, wherein the image has a set of color components,
wherein the at least some of the trapping edges defined by edge pixels are each an edge in one of the image color components, and
wherein the plurality of pixel buffers includes a pixel buffer for each color component, the pixel buffer of a color component containing at each pixel location the distance measure of that pixel location to the nearest so-far encountered edge pixel of the image in that color component, such that the comparing of the distance to an edge pixel of a color component compares the distance of said each pixel to the value stored in the pixel buffer of that color component containing at each pixel location the distance measure of that pixel location to the nearest so-far encountered edge pixel of that color component,
such that each color component of the image has an associated trapping image.

23. A method as described in claim 21, wherein the at least some of the trapping edges defined by edge pixels each have an associated trap color, and
wherein the plurality of pixel buffers includes a pixel buffer for each trap color component, the pixel buffer of a color component containing at each pixel location the distance measure of that pixel location to the nearest so-far encountered edge pixel of the image having that associated trap color, such that the comparing of the distance to an edge pixel associated with a trap color compares the distance of said each pixel to the value stored in the pixel buffer of that trap color containing at each pixel location the distance measure of that pixel location to the nearest so-far encountered edge pixel of that trap color,
such that each trap color has an associated trapping image.

24. A method as described in claim 20, wherein at each trapping edge a keepaway may be generated according to a keepaway criterion, the keepaway describing the amount to be subtracted from the original image, and
wherein the setting of a trap pixel also sets the pixels of a keepaway image in the case that a keepaway is generated.

25. A carrier medium carrying computer readable code segments to instruct one or more processors of a processing system to generate a trap pixel of a trap area surrounding one or more trapping edges of an image, the medium comprising:
one or more code segments to instruct the one or more processors, for each trapping edge in the image, for each pixel within a predefined area around the edge,
to compare the distance of said each pixel from the trapping edge according to a distance measure to determine if said each pixel is closer to the trapping edge than to another edge by comparing the distance measure of said each pixel with a provided measure indicative of the distance of the pixel from any edge of the image; and
if said pixel is closer to said edge than to any other edge, to set the pixel as a trap pixel of the trap area, including setting a trap color for the trap pixel.

26. A carrier medium as described in claim 25, further comprising:
one or more code segments to instruct the one or more processors to determine the trapping edges of the image by applying a trapping criterion to a neighborhood of each edge of the image.

27. A carrier medium as described in claim 26, further comprising:
one or more code segments to instruct the one or more processors to determine the edges of the image.

28. A carrier medium as described in claim 26, wherein at least some of the edges of the image are provided so that edge detection is not required for the provided edges.

29. A carrier medium as described in claim 25, wherein the provided measure is contained in a pixel buffer indicating for any pixel how close that pixel is to any edge, and wherein the distance comparing includes comparing the distance measure of said each pixel to the value in the pixel buffer,
the carrier medium further comprising,
one or more code segments to instruct the one or more processors to replace, if said pixel is closer to said edge than to any other edge as indicated by the comparison, the value in the pixel buffer with the distance measure of said each pixel from the trapping edge, such that the pixel buffer converges to indicating the closest distance of any pixel to any edge,
any traps generated around the trapping edges thereby being centerline traps.

30. A carrier medium as described in claim 25, wherein the trap color is user-provided.

31. A carrier medium as described in claim 25, wherein the trap color is determined according to a trapping criterion applied to a neighborhood of the trapping edge.

32. A carrier medium as described in claim 31, wherein the trapping criterion compares the lightness of the pixel to the lightness in the neighborhood.

33. A carrier medium as described in claim 25,
wherein the distance of a pixel from an edge point according to the distance measure defines a point distance function centered on the edge point, the maximum extent of the point distance function from the center defining a trapping distance,
wherein the point distance function is pre-calculated, and
wherein the distance comparing includes determining the distance of said each pixel from the trapping edge using the point distance function.

34. A carrier medium as described in claim 25,
wherein, the distance comparing includes determining the distance of said each pixel from the trapping edge by calculation on the fly.

35. A carrier medium as described in claim 25, wherein the extent of the predefined area around a trapping edge point defines a trapping distance, and wherein the trapping distance from any point on an edge varies as a function of direction from the point on the edge.

36. A carrier medium as described in claim 25, wherein the trap color of any trap pixel is modulated by a modulation factor, the modulation factor being a function of the distance from the trapping edge.

37. A carrier medium as described in claim 25, wherein at least some of the edges are defined by an edge line object having a geometric description, and wherein said comparing step includes determining the distance of said pixel from an edge using the geometric description of the edge line object for any edge defined by an edge line object.

38. A carrier medium as described in claim 25,
wherein at least some of the trapping edges are defined by a set of edge pixels, the method further comprising carrying out the steps of comparing and conditional trap pixel setting for each edge pixel of any edge defined by a set of edge pixels,
such that the carrier medium comprises one or more code segments to instruct the one or more processors,
for each edge defined by edge pixels, for each pixel within a predefined area around the edge pixel,
to compare the distance of said each pixel from the edge pixel according to the distance measure with a provided measure indicative of the distance of the pixel from any edge of the image to determining if said each pixel is closer to the edge than pixel to another edge; and
if said pixel is closer to said edge pixel than to any other edge, to set the pixel as a trap pixel of the trap area, including setting a trap color for the trap pixel.

39. A carrier medium as described in claim 38, wherein the comparing compares the distance of said each pixel to the value stored in a pixel buffer containing at each pixel location the distance measure of that pixel location to the nearest so-far encountered edge pixel of the image, and setting the trap pixel in said conditional trap pixel setting further includes replaces the value stored in the pixel buffer with the distance measure for the pixel,
the method thereby generating a centerline traps around the edge pixels.

40. A carrier medium as described in claim 39, wherein the pixel buffer is in a z-buffer such that the comparison step and conditional replacement step are automatically carried out.

41. A carrier medium as described in claim 39, further comprising:
one or more code segments to instruct the one or more processors to determine the edge pixels of the trapping edges by applying a trapping criterion to pixels of one or more edges of the image.

42. A carrier medium as described in claim 39, further comprising:
one or more code segments to instruct the one or more processors to determine the edge pixels of the one or more edges by edge detecting the image.

43. A carrier medium as described in claim 42, wherein the edge detecting includes edge enhancing the image and thresholding the results of enhancing.

44. A carrier medium as described in claim 39, wherein the setting of a trap pixel sets the pixels of a trapping image, the carrier medium further comprising:
one or more code segments to instruct the one or more processors to combine the image with the trapping image to form a trapped image.

45. A carrier medium as described in claim 38, wherein the comparing compares the distance of said each pixel to the values stored in a subset of a plurality of pixel buffers, each containing at each pixel location the distance measure of that pixel location to the nearest so-far encountered edge pixel of the image, each pixel buffer having an associated trapping image, and
wherein setting the trap pixel in said conditional trap pixel setting step further includes replaces the value stored in each pixel buffer of the subset with the distance measure for the pixel, and setting a pixel of each associated trapping image associated with each pixel buffer of the subset.

46. A carrier medium as described in claim 45, wherein the image has a set of color components,
- wherein the at least some of the trapping edges defined by edge pixels are each, an edge in one of the image color components, and
- wherein the plurality of pixel buffers includes a pixel buffer for each color component, the pixel buffer of a color component containing at each pixel location the distance measure of that pixel location to the nearest so-far encountered edge pixel of the image in that color component such that the comparing of the distance to an edge pixel of a color component compares the distance of said each pixel to the value stored in the pixel buffer of that color component containing at each pixel location the distance measure of that pixel location to the nearest so-far encountered edge pixel of the color component,
- such that each color component of the image has an associated trapping image.

47. A carrier medium as described in claim 45, wherein the at least some of the trapping edges defined by edge pixels each have an associated trap color, and
- wherein the plurality of pixel buffers includes a pixel buffer for each trap color component, the pixel buffer of a color component containing at each pixel location the distance measure of that pixel location to the nearest so-far encountered edge pixel of the image having that associated trap color, such that the comparing of the distance to an edge pixel associated with a trap color compares the distance of said each pixel to the value stored in the pixel buffer of that trap color containing at each pixel location the distance measure of that pixel location to the nearest so-far encountered edge pixel of that trap color,
- such that each trap color has an associated trapping image.

48. A carrier medium as described in claim 44, wherein at each trapping edge a keepaway may be generated according to a keepaway criterion, the keepaway describing the amount to be subtracted from the original image, and
- wherein the setting of a trap pixel also sets the pixels of a keepaway image in the case that a keepaway is generated.

49. A method for generating a trap area surrounding an point on an edge of an image, the trap area comprised of pixels having a color, the method comprising:
- for each pixel in an area surrounding the edge point,
  - determining the distance of the pixel from the edge point by calculating a distance measure indicative of the distance;
  - comparing the calculated distance measure with a second distance measure for the pixel indicative of the distance of the pixel to another edge, the comparing to determine if the pixel is closer to the edge point than to another edge; and
  - if the pixel is closer to the edge point than to any other edge, setting the pixel as a trap pixel of a trap region having a color determined according to a trapping criterion applied to the neighborhood of the edge.

50. A method as described in claim 49, wherein the step of setting the trap pixel further includes storing the distance of the pixel front the edge point, and wherein the second measure is a stored measure indicative of the distance of the pixel from any other edge of the image.

51. A method as described in claim 50, wherein said step of comparing compares the determined distance measure to the value stored in a pixel buffer containing at each pixel location the distance measure of that pixel location to the nearest edge of the image, and wherein said step of setting the trap pixel further replaces the value stored in the pixel buffer with the determined distance measure for the pixel,
- the method thereby generating a centerline trap area around the edge point according to the trapping criterion.

52. A method as described in claim 51, wherein the pixel buffer is in a z-buffer such that the comparison step is automatically carried out.

53. A method as described in claim 49, wherein said step of comparing compares the determined distance measure to the value stored in a pixel buffer containing at each pixel location the distance measure of that pixel location to the nearest so-far encountered edge of the image, and wherein said step of setting the trap pixel further replaces the value stored in the pixel buffer with the determined distance measure for the pixel,
- the method thereby generating a centerline trap area around the edge point according to the trapping criterion.

54. A method as described in claim 53, wherein the pixel buffer is in a z-buffer such that the comparison step is automatically carried out.

55. A method for trapping an image comprised of pixels at pixel locations, the method comprising:
- providing the edges of the image;
- determining the traps for the image; and
- combining the traps for the image with the image to obtain a modified image,
- said step of determining the traps for the image including, for each edge pixel of each edge provided in the edge providing step, determining if the edge pixel is to be trapped according to a trapping criterion applied to the neighborhood of the edge pixel, and if the edge pixel is to be trapped, for each pixel in an area surrounding the edge pixel,
  - determining the distance of the pixel from the edge pixel by calculating a distance measure indicative of the distance;
  - comparing the calculated distance measure with a stored value indicative of the distance of the pixel from an edge of the image to determine if the pixel is closer to the edge pixel than to any other edge; and
  - if the pixel is closer to the edge pixel than to any other edge, setting the pixel as a trap pixel of a trap region with a color determined according to the trapping criterion.

56. A method as described in claim 55, wherein said step of providing the edges of the image includes detecting the edges of the image.

57. A method as described in claim 56, wherein detecting edges of the image includes:
- enhancing the edges of the image to generate an edge enhanced image, and
- determining if a pixel is an edge pixel by comparing a pixel of the edge enhanced image to a threshold.

58. A method as described in claim 55, wherein said step of comparing compares the determined distance measure to the value stored in a pixel buffer containing at each pixel location the distance measure of that pixel location to the nearest so-far encountered edge of the image, and wherein said step of setting the trap pixel further replaces the value stored in the pixel buffer with the determined distance measure for the pixel.

59. A method as described in claim 58, wherein the pixel buffer is in a z-buffer such that the comparison step is automatically carried out.

60. A method for generating one or more trap areas surrounding edges in color components of an image, each trap area comprised of pixels having a color, the method comprising:

providing the edges of the image in each color component;

providing a buffer of values, one value per pixel location in the image, with all values initially set to an initial value, the values indicative of distance according to a distance measure, the initial value indicative of a distance larger than a pre-determined distance;

selecting an edge in a color component starting with a first edge and repeating for each selected edge:

selecting an edge pixel in the selected edge starting with a first edge pixel and repeating for each selected edge pixel:

selecting a pixel in all area surrounding the selected edge pixel, starting with a first selected pixel, the surrounding area defined by a pre-selected pattern around the first edge pixel, and repeating for each selected pixel;

determining the distance of the selected pixel from the selected edge pixel by calculating a distance measure indicative of the distance;

comparing the calculated distance measure with the corresponding value in the buffer to determine if the selected pixel is closer to the selected edge pixel than to any other edge; and if the comparison step indicates that the selected pixel is closer to the selected edge pixel than to any other edge, setting the selected pixel as a trap pixel of a trap region around the selected edge pixel, and replacing the value stored in the buffer with the determined distance measure for the pixel, the trap pixel setting including setting a trap color for the set trap pixel, until each pixel in the area surrounding each edge pixel of each edge has been selected.

61. A method as described in claim 60, wherein the color of the trap pixel set in the trap pixel setting step is determined according to a trapping criterion applied to the neighborhood of the selected edge pixel.

62. A method as described in claim 60, wherein the distance measure is an inverse measure with the minimum value of the measure being zero, and wherein, the initial value is zero.

63. An apparatus to generate a trap pixel of a trap area surrounding one or more trapping edges of an image, the apparatus comprising:

for each trapping edge in the image, for each pixel within a predefined area around the edge, distance comparing means to compare the distance of said each pixel from the trapping edge according to a distance measure with a provided measure indicative of the distance of the pixel from any edge of the image to determine if said each pixel is closer to the trapping edge than to another edge; and trap pixel setting means coupled to the comparing means to set the pixel as a trap pixel of the trap area if said pixel is closer to said edge than to any other edge, the setting including setting a trap color for the trap pixel.

64. An apparatus as described in claim 63, further comprising:

trapping-edge-determining means coupled to the comparing means to determine the edges of the image by applying a trapping criterion to a neighborhood of each edge of the image.

65. An apparatus as described in claim 64, further comprising: edge determining means to determine the edges of the image.

66. An apparatus as described in claim 63, further comprising a memory coupled to the comparing means, the memory storing a pixel buffer containing the provided measure, the pixel buffer indicating for any pixel how close that pixel is to any edge, wherein the distance comparing includes comparing the distance measure of said each pixel to the value in the pixel buffer, the apparatus further comprising replacement means coupled to said memory and to said distance comparing means, the replacement means to replace the value in the pixel buffer with the distance measure of said each pixel from the trapping edge if said pixel is closer to said edge than to any other edge as indicated by the comparison, such that the pixel buffer converges to indicating the closest distance of any pixel to any edge, any traps generated around the trapping edges thereby being centerline traps.

67. An apparatus as described in claim 63, further including means to accept the trap color from a user.

68. An apparatus as described in claim 63, further including trap-color determining means coupled to said trap setting means to determine the trap color according to a trapping criterion applied to a neighborhood of the trapping edge.

69. An apparatus as described in claim 63, wherein the distance of a pixel from an edge point according to the distance measure defines a point distance function centered on the edge point, the maximum extent of the point distance function from the center defining a trapping distance, wherein the point distance function is pre-calculated, and wherein the distance comparing means uses the point distance function to determine the distance of said each pixel from the trapping edge.

70. An apparatus as described in claim 63, wherein the distance comparing means determines the distance of said each pixel from the trapping edge by calculation on the fly.

71. An apparatus as described in claim 63, wherein the trap color of any trap pixel is modulated by a modulation factor, the modulation factor being a function of the distance from the trapping edge.

72. An apparatus as described in claim 63, wherein at least some of the trapping edges are defined by a set of edge pixels, wherein the distance comparing means and conditional trap pixel setting means carry out the distance comparing and conditional trap pixel setting for each edge pixel of any edge defined by a set of edge pixels.

73. An apparatus as described in claim 72, further comprising a memory coupled to said distance comparing means and conditional trap pixel setting means, wherein the distance comparing means compares the distance of said each pixel to the value stored in a pixel buffer stored in said memory, the pixel buffer containing at each pixel location the distance measure of that pixel location to the nearest so-far encountered edge pixel of the image, and wherein the conditional trap pixel setting means includes replacement means to replace the value stored in the pixel buffer with the distance measure for the pixel in the case that said pixel is closer to said edge pixel than to any other edge pixel as indicated by the comparison, the apparatus thereby generating a centerline traps around the edge pixels.

74. An apparatus as described in claim 73, wherein the memory is organized a z-buffer that includes the distance comparing means and conditional replacement means.

75. An apparatus as described in claim 73, further comprising:

trapping edge determining means to determine the edge pixels of the trapping edges by applying a trapping criterion to pixels of one or more edges of the image.

76. An apparatus as described in claim 73, further comprising:

an edge detector to determine the edge pixels of the one or more edges by edge detecting the image.

77. An apparatus as described in claim 73, further comprising:

a second memory coupled to the trap pixel setting means, the second memory to store a trapping image; and an image combiner coupled to the second memory, wherein the trap pixel setting means sets the pixels of the trapping image, and wherein the image combiner is to combine the trapping image with the image.

78. An apparatus to trapping an image comprised of pixels at pixel locations, the apparatus comprising:

a trapper accepting edges of the image as input to determine the traps for the image; and a combiner coupled to the trapper and accepting the image and the traps, the combiner to combine the traps for the image with the image to form a modified image, said trapper including:

a memory, trap decision means to determine for each edge pixel of each edge if the edge pixel is to be trapped according to a trapping criterion applied to a neighborhood of the edge pixel, distance comparing means coupled to said memory and to said trap decision means to compare, for each edge pixel to be trapped, for each pixel in an area surrounding the to-be-trapped edge pixel, the distance of the pixel from the edge pixel with a value stored in said memory indicative of the distance of the pixel from an edge of the image to determine if the pixel is closer to the edge pixel than to any edge, and trap setting means to set the pixel as a trap pixel of a trap region with a color determined according to the trapping criterion if the pixel is closer to the edge pixel than to any other edge.

79. An apparatus as described in claim 78, further comprising an edge detector coupled to said trapper and accepting the image as input.

* * * * *